US008035830B2

(12) United States Patent
Yoshida

(10) Patent No.: US 8,035,830 B2
(45) Date of Patent: Oct. 11, 2011

(54) IMAGE FORMING SYSTEM

(75) Inventor: Tatsuho Yoshida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 923 days.

(21) Appl. No.: 11/947,968

(22) Filed: Nov. 30, 2007

(65) Prior Publication Data

US 2008/0137126 A1    Jun. 12, 2008

(30) Foreign Application Priority Data

Dec. 7, 2006   (JP) ................................ 2006-330567

(51) Int. Cl.
   *G06F 3/12*      (2006.01)
   *G06K 15/00*     (2006.01)
(52) U.S. Cl. ....................................... 358/1.14; 358/1.1
(58) Field of Classification Search ................ 358/1.14, 358/1.9, 1.1, 1.6, 474, 468, 400, 404, 407, 358/434, 435, 436, 471
   See application file for complete search history.

(56) References Cited

U.S. PATENT DOCUMENTS

| 2003/0120834 | A1* | 6/2003 | Nishizawa | 710/16 |
| 2006/0103870 | A1* | 5/2006 | Lai et al. | 358/1.15 |
| 2006/0221367 | A1* | 10/2006 | Shiokawa | 358/1.13 |
| 2007/0013934 | A1* | 1/2007 | Hashimoto et al. | 358/1.13 |
| 2007/0019222 | A1* | 1/2007 | Oda et al. | 358/1.13 |
| 2007/0201091 | A1* | 8/2007 | Tanaka | 358/1.16 |
| 2008/0106604 | A1* | 5/2008 | Kojima | 348/207.2 |

FOREIGN PATENT DOCUMENTS

JP    2006127218 A    5/2006

\* cited by examiner

*Primary Examiner* — Jerome Grant, II
(74) *Attorney, Agent, or Firm* — Panitch Schwarze Belisario & Nadel LLP

(57) ABSTRACT

An image forming system includes an image information processing apparatus that outputs image data, at least one format converting apparatus that converts the image data into ready-to-print data, and an image forming apparatus that prints out the ready-to-print image data. These apparatuses are connected to a network such that they communicate with one another. The image information processing apparatus transmits image data to image forming apparatus. If the image forming apparatus supports the data format of the image data, the image data is printed in the image forming apparatus. If the image forming apparatus does not support the data format of the image data, the image data is transferred to the format converting apparatus. The format converting apparatus converts the image data into the ready-to-print data and then transmits the ready-to-print data back to the image forming apparatus, which in turn prints the ready-to-print data.

12 Claims, 15 Drawing Sheets

| EXTENSIONS | CONVERSION PROGRAMS |
|---|---|
| bmp | Picture Viewer |
| tif | Picture Viewer |
| jpg | Picture Viewer |
| txt | Text Editor |

| EXTENSIONS |
|---|
| prn |
| ps |
| pcl |

ERROR=DATA CANNOT BE PRINTED

FIG.4
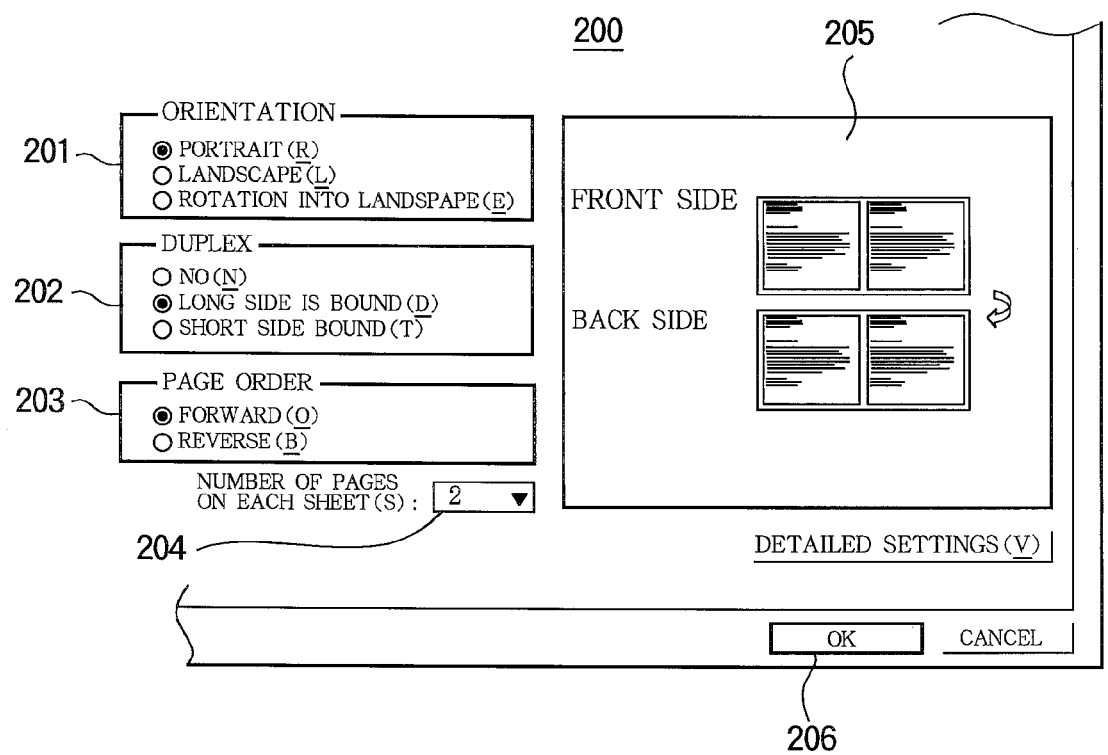
FIG.5A
| ITEMS OF SETTING | SETTING |
|---|---|
| ORIENTATION OF PRINTED IMAGE | 0/1/2 |
| DUPLEX | 0/1/2 |
| PRINTING ORDER | 0/1 |
| NUMBER OF PAGES ON EACH SHEET | 1/2/4/8 |
FIG.5B
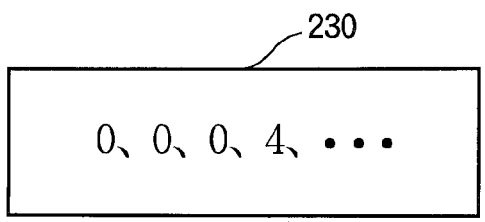

| APPARATUS NUMBER | IP ADDRESS |
|---|---|
| 1 | 192.168.0.20 |
| 2 | 192.168.0.40 |

| ADDRESSES (HEXADECIMAL) | CONTENTS |
|---|---|
| 00 | HEADER LENGTH |
| 01~02 | PACKET LENGTH |
| 03~04 | HEADER CHECKSUM |
| 05~08 | SOURCE IP ADDRESS |
| 09~0C | DESTINATION IP ADDRESS |
| 0D~10 | SOURCE APPARATUS NUMBERS |
| 11~14 | DESTINATION APPARATUS NUMBERS |

FIG.11A

HEADER H1

| ADDRESSES (HEXADECIMAL) | CONTENTS | |
|---|---|---|
| ⋮ | ⋮ | |
| 05~08 | 192.168.0.40 | ←IP ADDRESS A40 |
| 09~0C | 192.168.0.10 | ←IP ADDRESS A10 |
| 0D~10 | — | |
| 11~14 | — | |

FIG.11B

HEADER H2

| ADDRESSES (HEXADECIMAL) | CONTENTS | |
|---|---|---|
| ⋮ | ⋮ | |
| 05~08 | 192.168.0.10 | ←IP ADDRESS A10 |
| 09~0C | 192.168.0.20 | ←IP ADDRESS A20 |
| 0D~10 | 2 | |
| 11~14 | 1 | |

FIG.11C

HEADER H3

| ADDRESSES (HEXADECIMAL) | CONTENTS | |
|---|---|---|
| ⋮ | ⋮ | |
| 05~08 | 192.168.0.20 | ←IP ADDRESS A20 |
| 09~0C | 192.168.0.10 | ←IP ADDRESS A10 |
| 0D~10 | — | |
| 11~14 | 2 | |

FIG.11D

HEADER H4

| ADDRESSES (HEXADECIMAL) | CONTENTS |
|---|---|
| ⋮ | ⋮ |
| 05~08 | 192.168.0.10 | ←IP ADDRESS A10
| 09~0C | 192.168.0.40 | ←IP ADDRESS A40
| 0D~10 | 1 |
| 11~14 | 2 |

FIG.11E

HEADER H5

| ADDRESSES (HEXADECIMAL) | CONTENTS |
|---|---|
| ⋮ | ⋮ |
| 05~08 | 192.168.0.40 | ←IP ADDRESS A40
| 09~0C | 192.168.0.10 | ←IP ADDRESS A10
| 0D~10 | — |
| 11~14 | 1 |

FIG.11F

HEADER H6

| ADDRESSES (HEXADECIMAL) | CONTENTS |
|---|---|
| ⋮ | ⋮ |
| 05~08 | 192.168.0.20 | ←IP ADDRESS A20
| 09~0C | 192.168.0.10 | ←IP ADDRESS A10
| 0D~10 | — |
| 11~14 | — |

| FORMAT CONVERTING APPARATUS | IP ADDRESSES | EXTENSIONS |
|---|---|---|
| 201 | 192.168.0.201 | doc |
| 202 | 192.168.0.202 | pdf |
| 203 | 192.168.0.203 | bmp |

IMAGE FORMING SYSTEM

BACKGROUND OF THE INVENTION

1. Field of the Invention

The present invention relates to an image forming system in which an image forming apparatus such as a copying machine, a printer, and a facsimile machine is coupled to an information processing apparatus such as a personal computer (PC) that sends image data to the image forming apparatus over a network.

2. Description of the Related Art

A known conventional image forming system includes an information processing apparatus and an image forming apparatus connected to each other via a communication line such as a local network (LAN) or the Internet. The information processing apparatus generates image data or receives image data from an external device, and then outputs the image data. The image forming apparatus receives the image data from the information processing apparatus, and prints out the image data.

The image information processing apparatus incorporates a printer driver installed therein, so that the image forming apparatus prints out the image data received from the information processing apparatus. The printer driver converts the original image data (source image data) into a format supported by the image forming apparatus. Then, the image information processing apparatus transmits the converted image data to the image forming apparatus.

It is common that a plurality of image information processing apparatuses is connected to the communication line. If a plurality of image processing apparatuses is designed to access a single image forming apparatus, each of the image information processing apparatuses is required to have a printer installed therein.

However, installing a print driver into individual image information processing apparatuses is an intricate procedure. A number of image forming apparatuses are usually connected to the communication line. For example, it may be necessary to select an image forming apparatus from among a plurality of image forming apparatuses having different functions. Some of the image forming apparatuses may be replaced by new models of the same manufacturer or models available from different manufacturer.

Therefore, every time an image forming apparatus of the same model is added or an existing image forming apparatus is replaced by that of a new model or a different make, an appropriate printer driver has to be installed in the individual image information processing apparatuses. If a printer driver of a new model or a new version is to be installed in a large number of image information processing apparatuses, the man-hours for completing the installment is significant.

Furthermore, a long time is required for installing all the printer drivers for all types of image forming apparatuses, and a large memory capacity is required for storing the printer driver.

In order to solve this problem, if the data generated by an image information processing apparatus is in a file format that is not supported by an existing image forming apparatus, the data may be transmitted to another image information processing apparatus via the communication line for converting the data file format such that may be printed by one of the existing image forming apparatuses. However, if the data is converted into another data file format, the printing conditions may change accordingly. Therefore, mere conversion of the data file format can cause trouble in printing.

SUMMARY OF THE INVENTION

The present invention was made in view of the aforementioned problems.

An object of the invention is to provide an image forming system where the man-hours required for installing a printer driver for the entire image forming system is short.

Anther object of the invention is to provide an image forming system where a memory area for storing the printer drivers may be minimized.

Still another object of the invention is to provide an image forming system where no trouble occurs during printing.

An image forming system includes an image information processing apparatus that outputs image data, at least one format converting apparatus that converts the image data into ready-to-print data, and an image forming apparatus that prints out the ready-to-print image data. The image information processing apparatus, image forming apparatus, and the at least one format converting apparatus are connected such that the image information processing apparatus, one image forming apparatus, and the at least one format converting apparatus communicate with one another. The image information processing apparatus includes an image data transmitting section, a display information receiving section, a display section, an operation section, and a printing condition transmitting section. The image data transmitting section transmits the image data to the image forming apparatus. The display information receiving section receives display information from the format converting apparatus. The display section displays a printing condition setting screen in accordance with the display information. A user inputs printing conditions through the operation section. The printing condition transmitting section transmits the printing conditions to the format converting apparatus. The image forming apparatus includes a receiving section, a printing determining section, a transferring section, and a print engine. The receiving section receives either the image data from the image information processing apparatus or the ready-to-print image data from the format converting apparatus. The printing determining section makes a decision to determine whether the image forming apparatus supports conversion of the image data into the ready-to-print image data. The transferring section transfers the image data to the format converting apparatus if said printing determining section determines that the image forming apparatus supports conversion of the image data into the ready-to-print image data. The print engine prints the ready-to-print image data on a printing medium. The format converting apparatus includes a display information transmitting section, a printing condition receiving section, a data receiving section, and a ready-to-print image data transmitting section. The display information transmitting section transmits the display information to the image information processing apparatus. The printing condition receiving section receives a printing condition from the image information processing apparatus. The data receiving section receives the original image data from the image forming apparatus. The ready-to-print image data transmitting section transmits the ready-to-print image data to the image forming apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 3A illustrates the conversion determining table T1 stored in the HDD in the format converting apparatus;

FIG. 3B illustrates an example of file data indicative of an address (IP address) of the image information processing apparatus;

FIG. 3C illustrates an example of an extension table T2 that lists extensions of file formats supported by the image forming apparatus;

FIG. 3D illustrates an example of file data of the error information;

FIG. 4 illustrates an example of the printing condition setting screen, which is stored in the format converting apparatus;

FIG. 5A is a table that lists a variety of printing conditions, each of which is a set of the name of setting, and a setting;

FIG. 5B illustrates an example of file data for printing conditions, the numbers in the file data indicating the corresponding settings in FIG. 5A;

FIG. 7A illustrates an IP address table for an image information processing apparatus on the network;

FIG. 7B illustrates an IP address table for image information transmission source defined in the RAM;

FIG. 7C illustrates an example of the IP address table for the print image information transmission destination;

FIG. 9A illustrates the apparatus number administration table in which the apparatus numbers and corresponding IP addresses are stored in, for example, a ROM;

FIG. 9B illustrates the detail of the data structure of the header of the data packet shown in FIG. 2A;

FIG. 11A illustrates the data structure of a header of a data packet transmitted from the image information processing apparatus to the image forming apparatus;

FIG. 11B illustrates the data structure of a header of a data packet transmitted from the image forming apparatus to the format converting apparatus;

FIG. 11C illustrates the data structure of a header of a data packet transmitted from the format converting apparatus to the image forming apparatus;

FIG. 11D illustrates the data structure of a header of a data packet transmitted from the image forming apparatus to the image information processing apparatus;

FIG. 11E illustrates the data structure of a header;

FIG. 11F illustrates the data structure of a header;

FIG. 15 is a conversion apparatus determining table that holds extensions of file data that may be supported by image format converting apparatuses.

DETAILED DESCRIPTION OF THE INVENTION

First Embodiment

Figure 1:
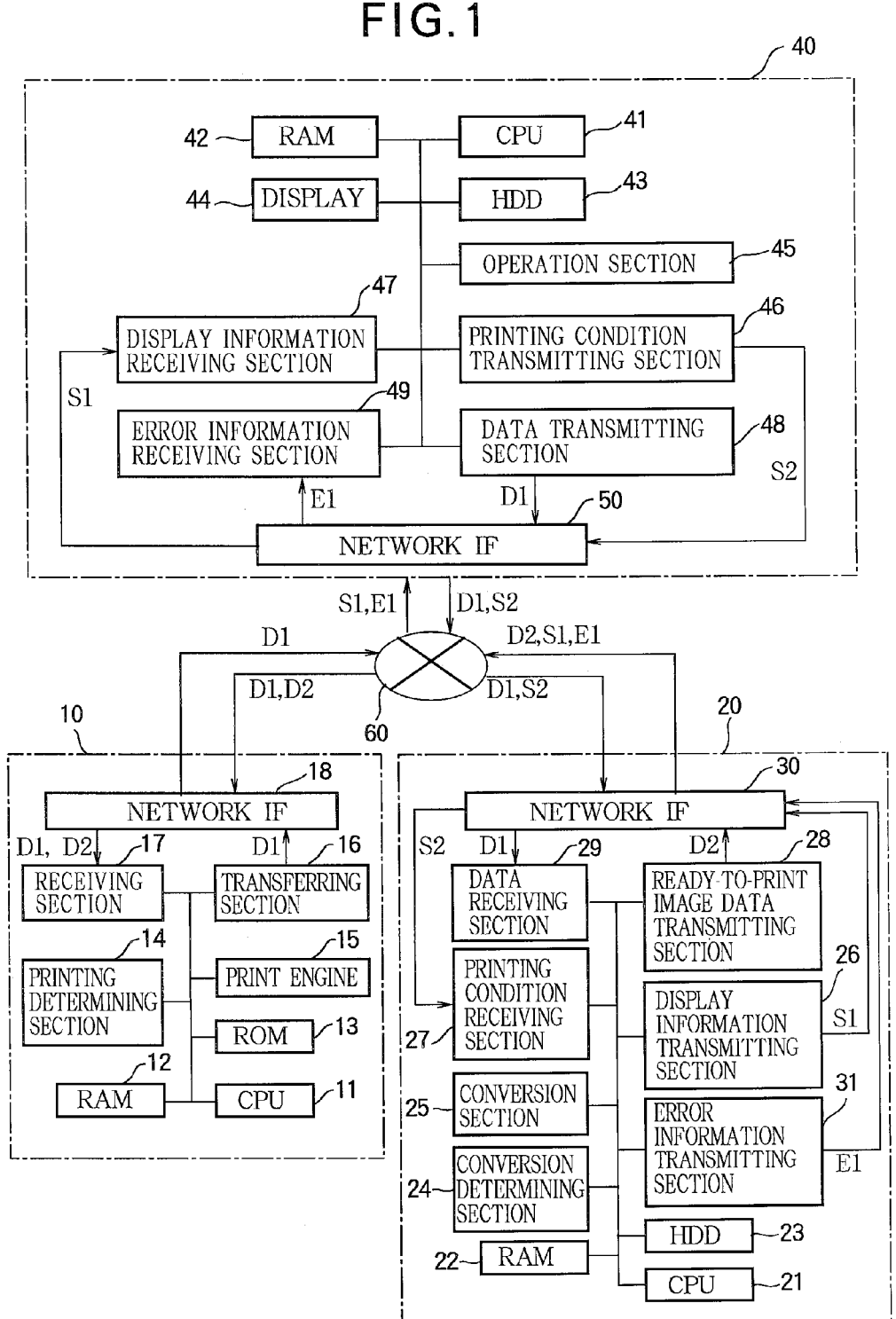
FIG. 1 is a block diagram illustrating an image forming system of a first embodiment.

FIG. 1 is a block diagram illustrating an image forming system of a first embodiment. Referring to FIG. 1, the image forming system includes an image forming apparatus 10, an image information processing apparatus 40, and a format converting apparatus 20, which are connected to one another via a network 60 such as the Internet or a local area network (LAN). The image forming apparatus 10 and image information processing apparatus 40 may be connected directly to each other via a cable or the like instead of via the network 60. In the first embodiment, it is assumed that the image forming apparatus 10 and image information processing apparatus 40 are connected to each other via the network 60.

The image forming apparatus 10 takes the form of, for example, a copying machine, a printer, or a facsimile machine. The image forming apparatus 10 receives printable data from the format converting apparatus 20 such as a personal computer (PC) connected to the network, and prints out the printable data. The printable data is data in a file format supported by the image forming apparatus 10, i.e., data that can be printed out properly by the image forming apparatus 10.

A central processing unit (CPU) 11 of the image forming apparatus 10 performs various arithmetic operations and decision making based on the information received from external devices and information stored in the image forming apparatus 10 under the control of programs previously stored in the image forming apparatus 10. The CPU 11 also controls the respective sections in the image forming apparatus 10 based on the results of arithmetic operations and decision making.

A random access memory (RAM) 12 is a volatile high-speed large-capacity memory. The RAM 12 temporarily stores the original image data D1 received from an image information processing apparatus 40 including a scanner, a cellular phone, or a PDA. The RAM 12 also stores ready-to-print image data D2, produced in the format converting apparatus 20 obtained by converting the original image data D1 into image data that can be printed in the image forming apparatus 10. The ready-to-print image data D2 is, for example, data or bit map encoded in a page description language. The RAM 12 also serves as an address memory that stores an IP address A40 that indicates the location of the image information processing apparatus 40 on the network 60.

A ROM 13 is a non-volatile memory in the form of, for example, a rewritable flash ROM that stores an extension table T2 and operation programs for the image forming apparatus 10. The extension table T2 holds extensions and will be described later in detail. The ROM 13 also stores an IP address A10 indicative of the location of the image forming apparatus 10 on the network 60, and an IP address A20 indicative of the location of the format converting apparatus 20 in the network 60.

A printing determining section 14 makes a decision to determine whether the received data (e.g., the original image data D1) is in a file format supported by the image forming apparatus 10. A print engine 15 includes a printer engine that prints the ready-to-print image data D2 on a printing medium.

A transferring section 16 is a section that transfers the original image data D1 to the format converting apparatus 20. For example, when the printing determining section 14 determines that the original image data D1 is in a file format not supported by the image forming apparatus 10, the transferring section 16 transfers the original image data D1 to the format converting apparatus 20. When the transferring section 16 transfers the original image data D1 to the format converting apparatus 20, the transferring section 16 also sends out the IP address A40, IP address A10, and IP address A20. A receiving section 17 is a section that receives the original image data D1 and the ready-to-print image data D2. The network interface (IF) 18 transmits and receives data between the devices connected to the network 60.

The format converting apparatus 20 receives the original image data D1 from the image forming apparatus 10 when the image forming apparatus 10 cannot print the original image data D1 received. Then, the format converting apparatus 20 converts the original image data D1 into the ready-to-print image data D2, and then sends the ready-to-print image data D2 to the image forming apparatus 10.

A central processing unit (CPU) 21 in the format converting apparatus 20 performs various arithmetic operations and decision making based on the information received from an external device and information stored in the format converting apparatus 20 under the control of programs previously stored in the format converting apparatus 20. The CPU 21 then controls the respective sections in the format converting apparatus 20 based on the results of arithmetic operations and decisions.

A random access memory (RAM) 22 is a volatile high-speed large-capacity memory, and temporarily stores the original image data D1 received from the image forming apparatus 10. The RAM 22 also stores the ready-to-print image data D2, which is printable data obtained by conversion of the file format of the original image data D1 into a file format supported by the image forming apparatus 10. The RAM 22 also serves as an address memory that stores the IP address A40 and IP address A10. The IP address A10 indicates the location of the image forming apparatus 10 in the network 60. The IP address A40 indicates the location of the image information processing apparatus 40 in the network 60.

An hard disk drive (HDD) 23 is a section that stores programs, the original image data D1, and the ready-to-print image data D2, and serves as a setting screen memory that stores the printing condition setting screen 200 for printing the ready-to-print image data D2. The HDD 23 also serves as an error information screen memory that contains error information E1. The error information screen is displayed if a conversion determining section 24 determines that the original image data D1 is in a file format not supported by the image forming apparatus 10. The HDD 23 also serves as an address memory that stores at least the IP address A40, IP address A10, and IP address A20 in the network 60. The HDD 23 also stores a conversion determining table T1 used for determining whether the original image data D1 can be converted into the ready-to-print image data D2. The HDD 23 stores application programs such as a word processor and a spreadsheet, which are conversion programs that convert the original image data D1 into the ready-to-print image data D2 in accordance with extensions of file data 102. The HDD 23 includes a printer driver that converts the original image data D1 into the ready-to-print image data D2, and that transmits the ready-to-print image data D2 to the image forming apparatus 10.

By using the conversion determining table T1 stored in the HDD 23, the conversion determining section 24 determines as to whether the original image data D1 can be converted into the ready-to-print image data D2. A conversion section 25 performs conversion of the original image data D1 into the ready-to-print image data D2 if the conversion determining section 24 determines that the original image data D1 may be converted into the ready-to-print image data D2. For example, if the conversion determining section 24 determines that the original image data D1 may be converted into the ready-to-print image data D2, the conversion section 25 reads from the HDD 23 an conversion program and a printer driver applicable to the original image data D1. Then, the conversion section 25 converts the original image data D1 into the ready-to-print data D2 in accordance with printing conditions S2.

A display information transmitting section 26 transmits display information S1 to the image information processing apparatus 40, so that a printing condition setting screen 200 is displayed on the image information processing apparatus 40. For example, when the conversion determining section 24 determines that the original image data D1 can be converted into the ready-to-print image data D2, the display information transmitting section 26 transmits the printing condition setting screen 200 as the display information S1 to the image information processing apparatus 40. The display information transmitting section 26 also transmits the IP address A40 and the IP address A20 together with the display information S1 to the image information processing apparatus 40.

A printing condition receiving section 27 receives a printing condition S2 from the image information processing apparatus 40. A ready-to-print image data transmitting section 28 transmits the ready-to-print image data D2 to the image forming apparatus 10. For example, when the conversion determining section 24 determines that the original image data D1 can be converted into the ready-to-print image data D2, the ready-to-print image data transmitting section 28 transmits the ready-to-print image data D2 to the image forming apparatus 10. The ready-to-print image data transmitting section 28 transmits the IP address A10 and the IP address A20 together with the ready-to-print image data D2.

A data receiving section 29 receives the original image data D1 from the image forming apparatus 10. A network IF 30 communicates data with devices connected to the network 60. An error information transmitting section 31 transmits the error information E1, more specifically a screen for displaying the error information, to the image information processing apparatus 40. The error information transmitting section 31 transmits the IP address A40 and the IP address A20 together with the error information E1 to the image information processing apparatus 40.

A central processing unit (CPU) 41 of the image information processing apparatus 40 performs various arithmetic operations and decision making based on information stored in the image information processing apparatus 40 under the control of programs previously stored in the image information processing apparatus 40. The CPU 41 also controls the respective sections in the image information processing apparatus 40 based on the arithmetic operations and decisions.

A RAM 42 is a volatile high-speed large-capacity memory, and temporarily stores the original image data D1 to be transmitted from the image information processing apparatus 40.

The RAM 42 also serves as an address memory that stores the IP address A10 and IP address A20. The IP address A10 indicates the location of the image forming apparatus 10 in the network 60. The IP address A20 indicates the location of the format converting apparatus 20.

An HDD 43 is a section that stores programs and the original image data D1, serving as an address memory that stores at least the IP address A40 and the IP address A10 in the network 60.

A display 44 is a flat type display that takes the form of a plasma display, a liquid crystal display (LCD), or a fluorescent display tube (CRT), and displays images and characters. The display section 44 displays the printing condition setting screen 200 in accordance with the display information S1, and the error information screen for displaying the error information E1. An operation section 45 is an input device that takes the form of, for example, a mouse or a key board through which a user inputs commands and instructions. When the printing condition setting screen 200 is displayed on the display section 44, the user is prompted to input his desired settings (e.g., inputs and selections) through the operation section 45. When the error information E1 is displayed on the display section 44, the user is prompted to input the necessary data and instructions through the operation section 45.

A printing condition transmitting section 46 transmits the printing conditions S2 to the format converting apparatus 20. A display information receiving section 47 receives the display information S1, required for displaying the printing condition setting screen 200, from the format converting apparatus 20.

A data transmitting section 48 transmits the original image data D1 together with the IP address A40 and the IP address A10 to the image forming apparatus 10. An error information receiving section 49 receives the error information El from the format converting apparatus 20. A network IF 50 communicates data with devices connected to the network 60.

The image information processing apparatus 40, image forming apparatus 10, and the format converting apparatus 20 are connected to one another via the network 60. Usually, a plurality of image forming apparatuses 10 and information processing apparatuses are connected to the network 60. The first embodiment assumes that a single image forming apparatus 10 and a corresponding single information processing apparatus 40 are connected to the network 60.

Figures 2A, 2B, 2C, 2D:
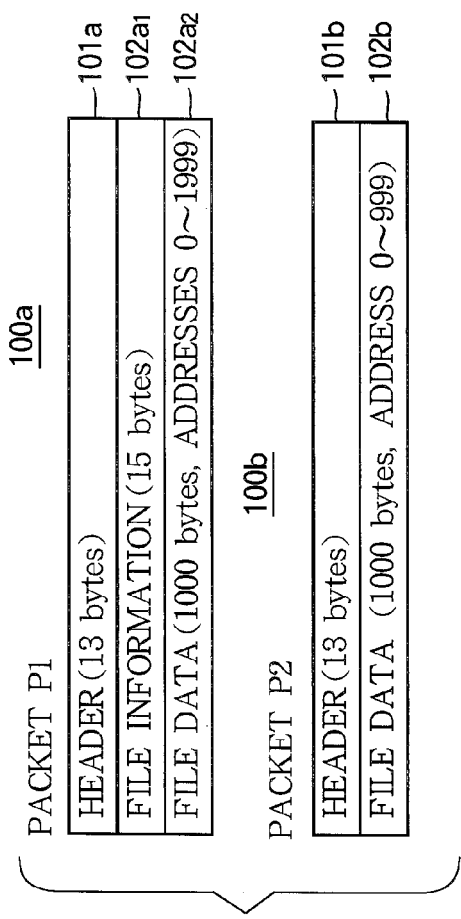
FIG. 2A illustrates the data structure of a data packet which is transmitted and received via the network.
FIG. 2B illustrates the structure of file data divided into data packets P1 and P2.
FIG. 2C illustrates the detail of the data structure of the header of the data packet in FIG. 2A.
FIG. 2D illustrates more detail of the data structure of the file data of the data packet of FIG. 2A.

FIG. 2A illustrates the data structure of a data packet which is transmitted and received via the network 60. The data packet 100 is used, for example, when file data (e.g., the original image data D1 and the ready-to-print image data D2) is transmitted. For example, if the network takes the form of the Internet, the data packet 100 contains a header 101 attached to the top of the file data 102 having a data length that can be transmitted via the Internet, the header 101 containing a destination IP address and a source IP address.

A data packet 100 in FIG. 2A has a fixed maximum length of data. For example, if the largest file data that the format converting apparatus 20 can accept is 1028 bytes and the file data 102 in FIG. 2A is 2000 bytes, then the file data 102 is divided into two parts as shown in FIG. 2B: a data packet P1 (100*a*) and a data packet P2 (100*b*) before transmission of the file data 102. The data packet P1 (100*a*) includes a header 101*a* of the packet PI (100*a*), file information (FIG. 2D) 102*a*1, and a starting data 102*a*2 (1000 bytes, i.e., addresses 000 to 999) of the file data 102. The data packet P2 (100*b*) includes a header H1 of the packet P2 (100*b*) and an ending data 102*a*2 (1000 bytes, i.e., addresses 1000 to 1999) of the file data 102. It is to be noted that the data packet P2 (100*b*) does not include file information.

FIG. 2C illustrates the detail of the data structure of the header 101 of the data packet 100 in FIG. 2A. FIG. 2C lists addresses in hexadecimal notation, and contents of the corresponding addresses. For example, an address 00H contains a header length. The header 101 occupies addresses 00H-0CH, accordingly the content (i.e., header length) of address 00H is address 0CH. Likewise, a packet length is stored at addresses 01H-02H. A header checksum for the header 101 is stored at addresses 03H-04H. A source IP address for the data packet 100 is stored at addresses 05H-08H. A destination IP address for the data packet 100 is stored at addresses 09H-0CH.

FIG. 2D illustrates more detail of the data structure of the file data 102 of the data packet 100 of FIG. 2A. File name, extension K1, and file data size constitute the file information and are stored at addresses 00H-0EH. Address 0FH and onward store actual data. A file name is stored at addresses 00H-07H. An extension K1 is stored at addresses 08H-0AH. A file data size is stored at addresses 0BH-0EH.

FIG. 3A illustrates the conversion determining table T1 stored in the HDD 23 in the format converting apparatus 20. The conversion determining table T1 is used for determining whether the original image data D1 can be converted into the ready-to-print image data D2. The table T1 lists extensions and corresponding conversion programs. A conversion program corresponding to an extension "bmp" is Picture Viewer, "bmp" representing the file format of data of an image file, i.e., in a bit map format. A conversion program corresponding to an extension "tif" is Picture Viewer, "tif" representing the file format of data of an image file, i.e., a TIF format. A conversion program corresponding to an extension "jpg" is Picture Viewer, "jpg" representing the file format of image file, i.e., JPEG format. A conversion program corresponding to an extension "txt" is Text Editor, "txt" representing a text file, i.e., character data only.

FIG. 3B illustrates an example of file data indicative of an address (IP address) of the image information processing apparatus 40. The file data looks like this: IP=192.168.0.40, which is the address of the image information processing apparatus 40 on the network 60.

FIG. 3C illustrates an example of an extension table T2 that lists extensions of file formats supported by the image forming apparatus 10. Extension "prn" is added to a file that has been encoded in page description language "PostScript" available from AdobeSystem, specifying the file format of a printer. An extension "ps" is added to an image file that has been encoded in page description language "PostScript" available from AdobeSystem, specifying the file format of the image file. Extension "pcl" is added to the file that has been encoded in page description language "PCL" available from Hewlett-Packard, specifying the file format supported by a printer.

FIG. 3D illustrates an example of file data of the error information. When the original image data D1 cannot be converted into the ready-to-print image data D2, the error information "ERROR=data cannot be printed" is sent to the image information processing apparatus 40 notifying that the data is in an unsupported file format.

FIG. 4 illustrates an example of the printing condition setting screen 200, which is stored in the format converting apparatus 20. The printing condition setting screen 200 is displayed on the display section 44 of the image information processing apparatus 40. "Print orientation" 201 includes "portrait (R)," "landscape (L)," and "rotation into landscape (E)." An appropriate radio button is selected. "Duplex" 202 includes "NO (i.e., simplex)," "long side is bound (D)," and "short side is bound (T)." An appropriate radio button is selected. "Page order" 203 includes "forward (O)" and "reverse (R)." "Number of pages" 204 indicates a total number of pages of a document printed on each page in N-up printing (i.e., page layout printing). "Preview image" 205 provides an image in a reduced size to show what it will look like when the print data is actually printed on a sheet of medium. The preview image 205 is formed based on the options selected at "Print orientation" 201, "Duplex" 202, and "Page order" 203. After making all the selections, the user clicks on an "OK" button 206 so that the selections are transmitted as printing conditions from the image information processing apparatus 40 to the format converting apparatus 20.

FIG. 5A is a table that lists a variety of printing conditions, each of which is a set of an item of setting and a corresponding setting. Orientation of printed image is selected from settings 0, 1, and 2. Duplex is selected from 0, 1, and 2. Printing order is selected from 0 and 1. The number of pages for N-up printing is selected from 1, 2, 4, and 8. For example, the orientation of printed image in FIG. 5A is selected to be "0", "1" or "2" for "portrait (R)," "landscape (L)," or "rotation into landscape (E)", respectively.

FIG. 5B illustrates an example of file data 230 for printing conditions S2, the numbers in the file data 230 indicating the corresponding settings in FIG. 5A. The numbers are aligned from left to right in the order they appear in FIG. 5A. In other words, "0," "0," "0," and "4" denote "Orientation of printed image," "Duplex," "Printing order," and "Number of pages".

Figure 6:
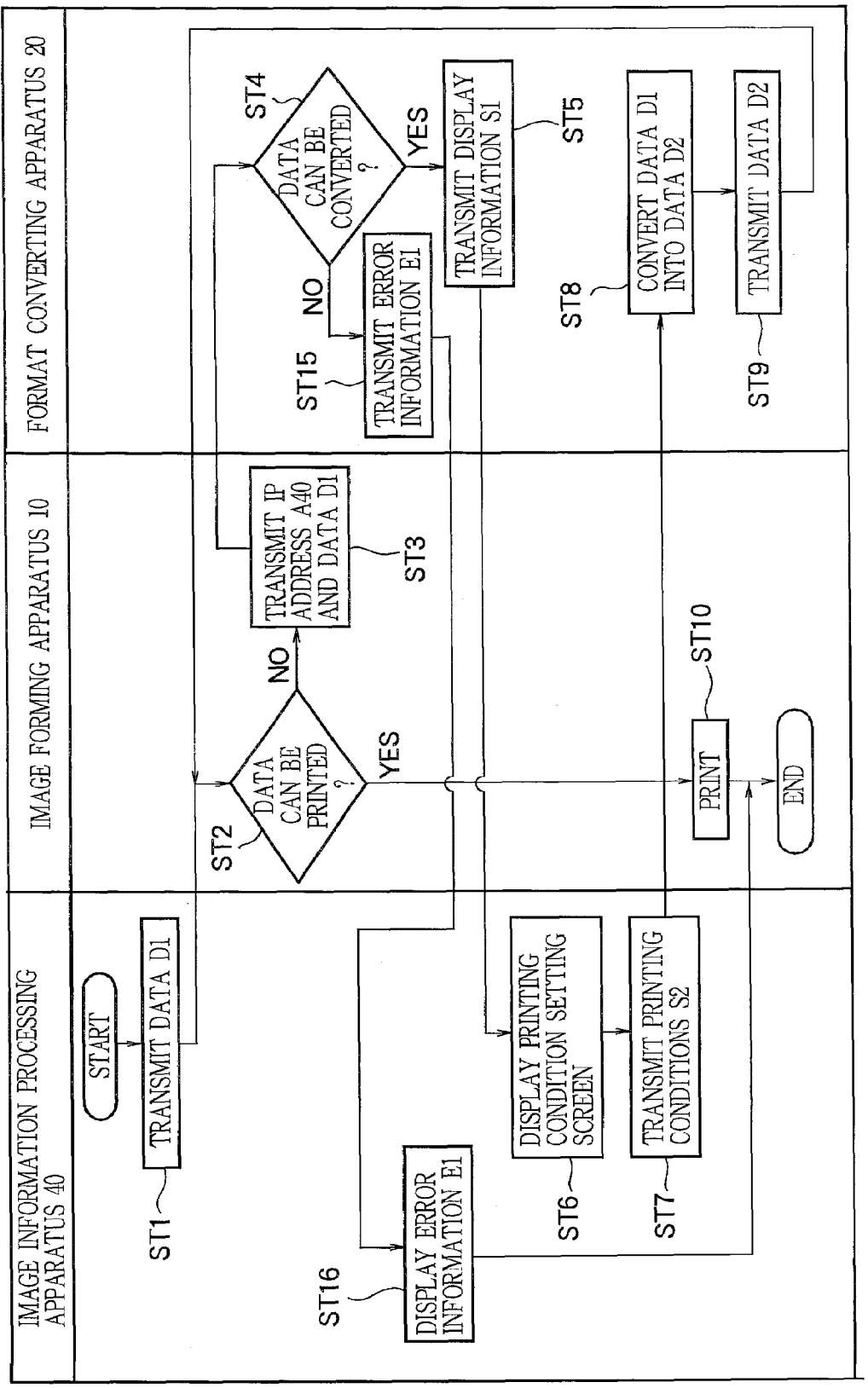
FIG. 6 is a flowchart illustrating the operation of the image forming system.

The operation of the image forming system will be described. FIG. 6 is a flowchart illustrating the operation of the image forming system. FIG. 7A illustrates an IP address table for an image information processing apparatus 40 on the network 60. FIG. 7B illustrates an IP address table for image information transmission source defined in the RAM 42. FIG. 7C illustrates an example of the IP address table for the print image information transmission destination.

On the image information processing apparatus 40 side, the user operates the operation section 45 to specify printing of the original image data D1. Then, the CPU 41 instructs the data transmitting section 48 to transmit the original image data D1 stored in the HDD 43 to the image forming apparatus 10 via the network IF 50. As shown in FIG. 2C, the transmitting section 48 adds a header to the starting end of the original image data D1, and then transmits the original image data D1 to the network IF 50. The header including the header length, packet length, header checksum, source IP address, and destination IP address. By means of the destination IP address, the network IF 50 transfers the original image data D1 to the receiving section 17 of the image forming apparatus 10 (ST1).

On the image forming apparatus 10 side, the network IF 18 receives the original image data D1, and then transfers the original image data D1 to the receiving section 17. The receiving section 17 extracts the source IP address from the header of the original image data D1, and then stores it as the IP address A40 of the image information processing apparatus 40 into the RAM 12. The receiving section 17 also stores the original image data D1 into the RAM 12. Thereafter, the printing determining section 14 determines whether the image forming apparatus 10 supports the file format of the original image data D1.

The printing determining section 14 extracts the extension K1 from the file data 102 (FIG. 2) from the original image data D1 stored in the RAM 12, and checks the extension K1 to determine whether the extension in the extension table T2 (FIG. 3C) contains the same extension as the extension K1 (ST2). In the first embodiment, the image forming apparatus 10 supports data file formats having the extensions "prn," "ps," and "pcl."

If the extension table T2 holds the same extension as the extension K1, it follows that the original image data D1 is in a file format supported by the image forming apparatus 10. Thus, the printing determining section 14 determines that the original image data D1 is in a file format supported by the image forming apparatus 10 (ST2: YES), and the image forming apparatus 10 prints out the content of the original image data D1 (ST10).

If the image forming apparatus 10 does not hold the same extension as the extension K1, it is determined that the original image data D1 is in an unsupported file format, and the conversion of file format is required before printing (ST2: NO). Thus, the CPU 11 of the image forming apparatus 10 instructs the transferring section 16 to transmit the IP address A40 (FIG. 3B) and the original image data D1 by separate packets via the network IF 18 to the format converting apparatus 20 (ST3). When the file data of the IP address A40 and the original image data D1 are sent in packet form, the IP address A10 is stored into the source IP address of the header and the IP address A20 is stored into the destination IP address of the header. The file data of the IP address A40 and the original image data D1 are transmitted in this order. The IP address A20 has been previously stored in a ROM 13. When the image forming apparatus 10 transmits some data to the format converting apparatus 20, the image forming apparatus 10 specifies the IP address A20 as a destination IP address added to the header.

On the format converting apparatus 20 side, when the network IF 30 receives the packet of the IP address A40 and the packet of the original image data D1, the network IF 30 transfers the IP address A40 and the original image data D1 to the data receiving section 29. The data receiving section 29 stores the IP address A40 and the original image data D1 into the HDD 23. The data receiving section 29 stores the received IP address A40 into a source IP address storing area (FIG. 7A) defined in the HDD 23.

On the format converting apparatus 20 side, the CPU 21 reads the extension K1 from the original image data D1 stored in the HDD 23 by way of an address number shown in FIG. 2D, and then stores the extension K1 into the RAM 22. The conversion determining section 24 makes a decision to determine whether the conversion determining table T1 (FIG. 3A) holds the same extension as the extension K1 in the RAM 22, thereby determining whether the original image data D1 can be converted into a file format supported by the image forming apparatus 10 (ST4).

{Operation when Data D1 can be Converted}

When the original image data D1 can be converted into the ready-to-print image data D2 by the format converting apparatus 20, the image forming system operates as follows:

The conversion determining section 24 determines that the original image data D1 can be converted into the ready-to-print image data D2, if the conversion determining table T1 (FIG. 3A) holds the same extension as the extension K1 in the RAM 22 (ST4: YES), and then performs the following processing.

The CPU 21 in the format converting apparatus 20 instructs the display information transmitting section 26 to transmit the display information S1 to the image information processing apparatus 40 via the network IF 30 (ST5), the display information S1 being used for the display section 44 to display the printing condition setting screen 200 (FIG. 4). The IP address A40 stored in the source IP address storing area (FIG. 7A) is specified as the destination IP address to be added to the header of the display information S1.

Upon receiving the display information S1 from the format converting apparatus 20, the network IF 50 of the image information processing apparatus 40 transfers the display information S1 to the display information receiving section 47. The display information receiving section 47 stores the source IP address A20, added to the header of the display information S1, into the IP address table (FIG. 7B) for image information transmission source defined in the RAM 42. The display information receiving section 47 also transfers the display information S1 to the display section 44, which in turn displays the printing condition setting screen 200 as shown in FIG. 4 (ST6).

By referring to the printing condition setting screen 200 displayed on the display section 44, the user operates the operation section 45 to input selections and commands to set printing conditions.

The printing conditions include those shown in FIG. 5A. When the user clicks on the OK button 206 (FIG. 4), the CPU 41 converts the selected settings into the file data 230 having the printing conditions S2 as shown in FIG. 5B.

When the "Print orientation" 201 is "portrait (R)", "landscape (L)", or "rotation into landscape (E)," a corresponding setting (i.e., "0", "1", or "2") is selected. Then, the CPU 41 stores the selected setting as "print orientation" of the file data 230 having the printing conditions S2 of FIG. 5B.

Likewise, when the "duplex" 202 is "NO", "a long side is bound," or "a short side is bound," a corresponding setting, (i.e., "0", "1", or "2") is selected. Then, the CPU 41 stores the selected setting as "duplex" of the file data 230 having the printing conditions S2 of FIG. 5B.

Likewise, when the "page order" 203 is "forward (O)" or "reverse (R), a corresponding setting (i.e., "0" or "1") is selected. Then, the CPU 41 stores the selected setting as "page order" of the file data 230 having the printing conditions S2 of FIG. 5B.

Likewise, when the "Number of pages" 204 is "1", "2," "4," or "8," a corresponding setting (i.e., "1", "2", "4" or "8") is selected. Then, the CPU 41 stores the selected setting as "Number of pages" of the file data 230 having the printing conditions S2 of FIG. 5B.

As described above, the CPU 41 produces the file data 230 having the printing conditions S2 based on the settings on the printing condition setting screen 200. After the user has set the printing conditions S2, the CPU 41 instructs the printing condition transmitting section 46 to transmit the file data 230 having the printing conditions S2 to the format converting apparatus 20 via the network IF 50 (ST7). The destination IP address added to the header is the IP address A20, which is read from the IP address table for image information transmission source defined in the RAM 42.

Upon receiving the file data 230 having the printing conditions S2, the network IF 30 of the format converting apparatus 20 transfers the file data 230 to the printing condition receiving section 27, which in turn stores the file data 230 into the HDD 23. The CPU 21 reads the original image data D1 from the HDD 23, and sends the original image data D1 to the conversion section 25 which includes a conversion program and a printer driver. In accordance with the printing conditions S2, the conversion section 25 converts the original image data D1 into the ready-to-print image data D2 (e.g., data or bit map encoded in a page description language) in a file format supported by the image forming apparatus 10, and then stores the ready-to-print image data D2 into the HDD 23 (ST8). Here, the extension of the ready-to-print data D2 is "prn".

The CPU 21 in the format converting apparatus 20 instructs the ready-to-print image data transmitting section 28 to transmit the ready-to-print image data D2 to the image forming apparatus 10 via the network IF 30 (ST9). The destination IP address added to the header is the IP address A10, which has been previously stored in the IP address table for the print image information transmission destination (FIG. 7C) defined in the HDD 23.

Upon receiving the ready-to-print image data D2, the network IF 18 of the image forming apparatus 10 transfers the ready-to-print image data D2 to the receiving section 17, which in turn stores the ready-to-print image data D2 into the RAM 12. Thereafter, the printing determining section 14 makes a decision to determine whether the ready-to-print image data D2 is in a file format supported by the image forming apparatus 10 (ST2). The printing determining section 14 extracts the extension K1 from the file data shown in FIG. 2D, and makes a decision to determine whether the extension K1 is present in the conversion determining table T1 shown in FIG. 3C. The extension K1 of the ready-to-print image data D2 is "prn," which exists in the conversion determining table T1. Thus, the program proceeds to step ST10. The CPU 11 analyzes and renders the ready-to-print image data D2 encoded in a page description language to produce image data that can be printed in the image forming apparatus 10, and then stores the rendered image data into the RAM 12. The CPU 11 then instructs the print engine 15 to print the image data in the RAM 12 (ST10).

{Operation when Data D1 Cannot be Converted}

When the original image data D1 cannot be converted into the ready-to-print image data D2 by the format converting apparatus 20, the image forming system operates as follows:

The conversion determining section 24 determines that the original image data D1 cannot be converted into the ready-to-print image data D2, if the extension K1 is not present in the conversion determining table T1 (FIG. 3A) stored in the RAM 22 (ST4: NO). Then, the conversion determining section 24 then performs the following processing.

The CPU 21 instructs the error information transmitting section 31 to transmit the error information E1 to the image information processing apparatus 40 via the network IF 30 (ST15) The error information E1 is transmitted as file data 190 (FIG. 3D) via the network IF 30. When the format converting apparatus 20 transmits any data to the image information processing apparatus 40, the format converting apparatus 20 specifies the IP address A40, stored in the source IP address table, as a destination IP address to be added to the header of the data.

Upon receiving the error information E1 from the error information transmitting section 31, the network IF 50 of the image information processing apparatus 40 transfers the error information E1 to the error information receiving section 49, which in turn transfers the error information E1 to the display section 44. The display section 44 displays the error information E1 (ST16). This completes the operation.

{Outline of Operation of Image Forming System}

The outline of the flow of the operation of the image forming system of the first embodiment is as follows:

The image information processing apparatus 40 transfers the original image data D1 to the image forming apparatus 10. The image forming apparatus 10 makes a decision to determine whether the received original image data D1 is in a file format supported by the image forming apparatus 10. If not, the image forming apparatus 10 sends the original image data D1 to the format converting apparatus 20 which in turn converts the original image data D1 into the ready-to-print data D2. Then, the image forming apparatus 10 receives the readyto-print data D2 from the format converting apparatus 20, and then prints the ready-to-print data D2. Prior to the conversion of the original image data D1 into the ready-to-print data D2, the format converting apparatus 20 transmits the display information S1 to the image information processing apparatus 40, thereby prompting the user to input the settings for printing from the image information processing apparatus 40 side. Thus, the image information processing apparatus 40 sends the settings for printing to the format converting apparatus 20.

{Outline of Conversion Operation}

The outline of the flow of the conversion operation of the format converting apparatus 20 is as follows:

When the data receiving section 29 receives the original image data D1, the CPU 21 reads the extension stored in addresses 080-0AH of the file data, and the conversion determining section 24 makes a decision to determine whether the extension K1 is present in the conversion determining table T1 stored in the RAM 22, thereby determining whether the original image data D1 can be converted into a file format by which the original image data D1 can be printed by the image forming apparatus 10. The received original image data D1 is temporarily stored into the RAM 22 and is then stored into the HDD 23. If the extension is the extension K1, then the conversion section 25 reads from the HDD 23 a conversion program and a printer driver that is capable of converting the original image data D1 into the ready-to-print image data D2. Then, under the control of the conversion program, the conversion section 25 converts the original image data D1 into a file format that can be accepted by the printer driver, and then outputs the converted image data as ready-to-print image data D2 to the image forming apparatus 10.

As described above, in the first embodiment, the image information processing apparatus 40 and the image forming apparatus 10 are coupled to each other via the network 60. Alternatively, the image information processing apparatus 40 and the image forming apparatus 10 may be directly coupled to each other via a USB, in which case the same operation may be performed as long as the image information processing apparatus 40 and the image forming apparatus 10 are coupled to the network 60.

The first embodiment solves the problem that conventional printer drivers require a long install time and a printer driver occupies a large portion of a memory, thereby saving the man-hours and the time required for installing the printer drivers for the entire image forming system as well as minimizing a memory area in the image information processing apparatus 40 in which the printer driver for the image forming apparatus is stored. Thus, printing may be performed promptly without trouble.

Second Embodiment

Figure 8:
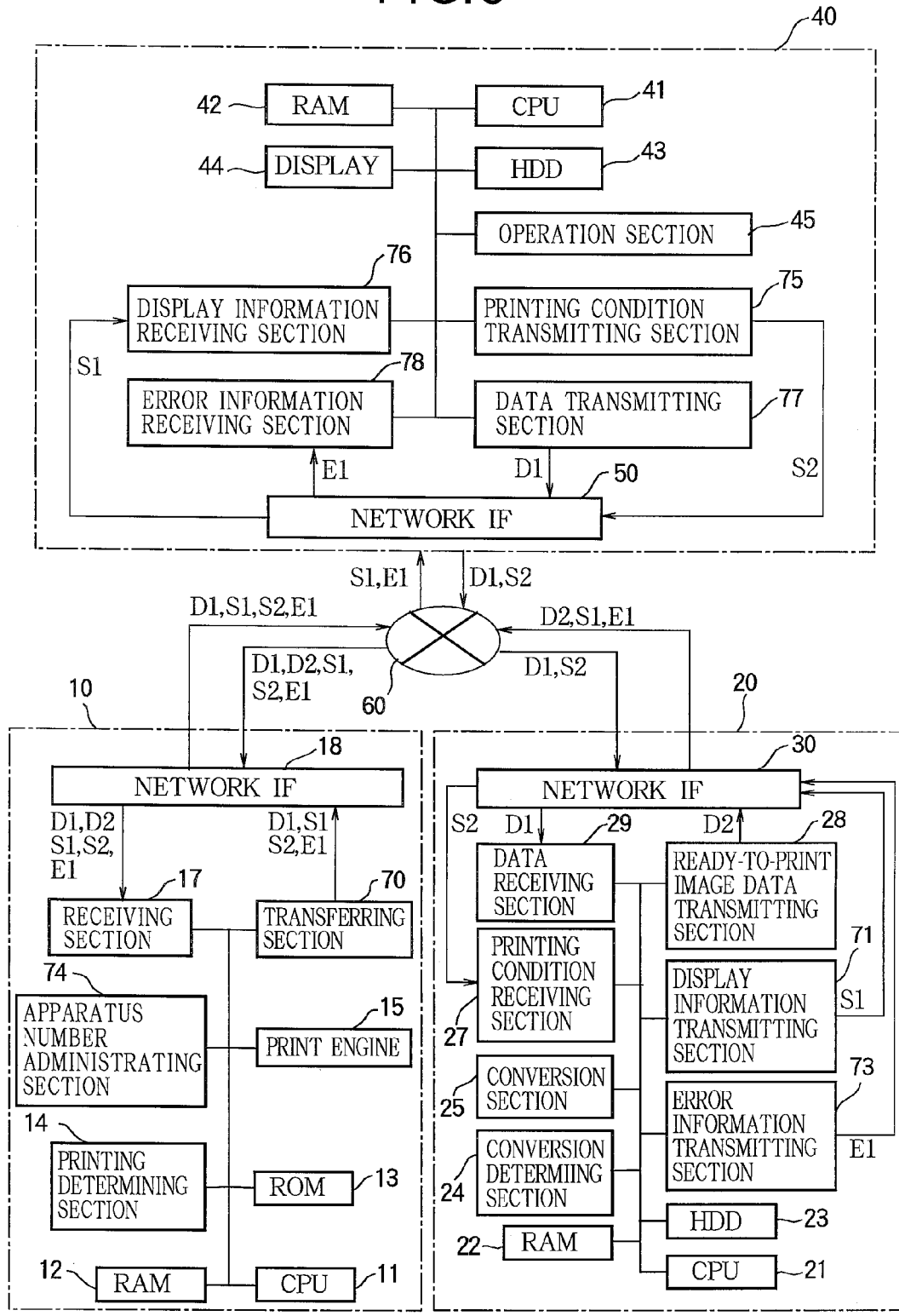
FIG. 8 is a block diagram illustrating an image forming system of a second embodiment.

FIG. 8 is a block diagram illustrating an image forming system of a second embodiment. Elements similar to those of the first embodiment have been given the same reference numerals and their description is omitted.

In an image forming apparatus 10, a transferring section 70 transfers not only original image data D1 but also print conditions S2 to a format converting apparatus 20. The transferring section 70 also transfers display information S1 and error information E1 to an image information processing apparatus 40. An apparatus number administrating section 74 includes an apparatus number administration table shown in FIG. 9A that lists apparatus numbers assigned to the format converting apparatus 20 and image information processing apparatus 40 and corresponding IP addresses in accordance with which the information inputted to and outputted from the image processing apparatuses 20 may be administered. If the image forming system includes a plurality of format converting apparatuses 20, their apparatus numbers and corresponding IP addresses are stored in the apparatus number administration table.

FIG. 9A illustrates the apparatus number administration table in which the apparatus numbers and corresponding IP addresses are stored in, for example, a ROM 13. Referring to FIG. 9A, the apparatus number is "1" and the corresponding IP address is "192.168.0.20." If the image forming system includes a second format converting apparatus 20, an apparatus number "2" and a corresponding IP address are added in the apparatus number administration table.

When the image forming apparatus 10 is unable to print the original image data D1 received from the image information processing apparatus 40, the image forming apparatus 10 reads the IP address corresponding to the apparatus number "1" from the ROM 13, and transfers the original image data D1 to the format converting apparatus 20 whose apparatus number is "1".

When the data receiving section 29 receives the original image data D1, the format converting apparatus 20 whose apparatus number is "1" stores the original image data D1 into the HDD 23 just as in the first embodiment. Then, a display information transmitting section 71 transmits the display information S1 to the image forming apparatus 10, the display information S1 being used for the image information processing apparatus 40 to display a printing condition setting screen 200.

Thereafter, the image forming apparatus 10 transfers the display information S1 to the image information processing apparatus 40, and the image information processing apparatus 40 sends back the print conditions S2 to the format converting apparatus 20 via the image forming apparatus 10. This operation will be described later with reference to FIG. 10.

In the format converting apparatus 20, a print condition receiving section 72 of receives the print conditions S2 from the image forming apparatus 10. When the conversion determining section 24 of the format converting apparatus 20 determines that the original image data D1 cannot be converted into a file format supported by the image forming apparatus 10, an error information transmitting section 73 sends the error information E1 to the image forming apparatus 10.

In the image information processing apparatus 40, a print condition transmitting section 75 of transmits the printing conditions S2 to the image forming apparatus 10. An information receiving section 76 receives the display information S1 from the image forming apparatus 10. A data transmitting section 77 transmits the original image data D1 to the image forming apparatus 10. An error information receiving section 78 receives the error information E1 from the image forming apparatus 10.

FIG. 9B illustrates the detail of the data structure of the header 101a of the data packet 100 shown in FIG. 2A. Addresses 0DH-10H hold source apparatus numbers, and addresses 11H-14H hold destination apparatus numbers. Referring to FIG. 9B, address 00H holds a header length, address 01H-02H hold a packet length, addresses 03H-04H hold a checksum, addresses 05H-08H hold a source IP address, and addresses 09H-0CH hold a destination IP address.

Figure 10:
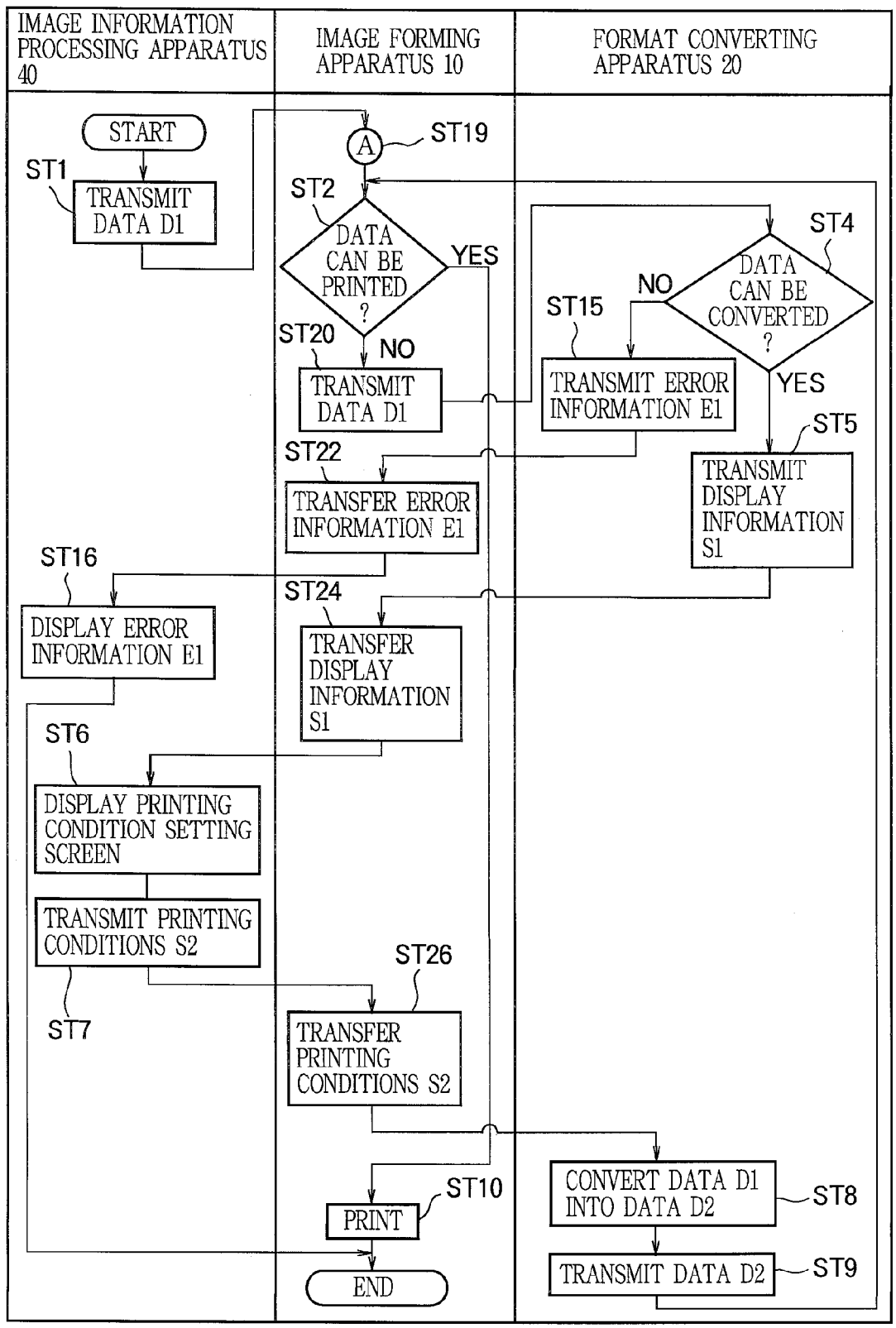
FIG. 10 is a flowchart illustrating the operation of the image forming system.

The operation of the image forming system of the second embodiment will be described in detail. FIG. 10 is a flowchart illustrating the operation of the image forming system. Steps ST1, ST2, ST4-ST10, ST15, and ST16 are the same as those of the first embodiment shown in FIG. 6, and their description is omitted.

FIG. 11A illustrates the data structure of a header H1 of a data packet transmitted from the image information processing apparatus 40 to the image forming apparatus 10. FIG. 11B illustrates the data structure of a header H2 of a data packet transmitted from the image forming apparatus 10 to the format converting apparatus 20. FIG. 11C illustrates the data structure of a header H3 of a data packet transmitted from the format converting apparatus 20 to the image forming apparatus 10. FIG. 11D illustrates the data structure of a header H4 of a data packet transmitted from the image forming apparatus 10 to the image information processing apparatus 40. FIG. 11E illustrates the data structure of a header H5 attached to the printing conditions S2. FIG. 11F illustrates the data structure of a header H6 attached to the ready-to-print data D2.

The following is the detailed operation of the second embodiment.

At step ST1, the data transmitting section 77 adds the header H1 to the original image data D1 in addition to the header length 121, packet length 122, and header checksum 123, the header H1 containing "192.168.0.40 (=IP address A40)" as a source IP address, and "192.168.0.10 (=IP address A40)" as a destination IP address. The data transmitting section 77 then transmits the original image data D1 having the header H1 to a network IF 50 without specifying the destination apparatus number and source apparatus number. The network IF 50 then transfers the original image data D1 to the receiving section 17 of the image forming apparatus 10 (i.e., destination IP address "192.168.0.10" in the header H1).

The image forming apparatus 10 operates in the same way as the first embodiment up to an operation where the receiving section 17 stores the source IP address and the original image data D1 into the RAM 12. Thereafter, as shown in processing "A" shown in FIG. 10, the apparatus number administrating section 74 performs processing denoted "A" in at step ST19 where a check is made to determine whether the source IP address is the same as one of the IP addresses stored in the apparatus number administration table (FIG. 9A) (ST19). Thereafter, a check is made at step ST2 to determine whether the original image data D1 is in a file format supported by the image forming apparatus 10.

Figure 12:
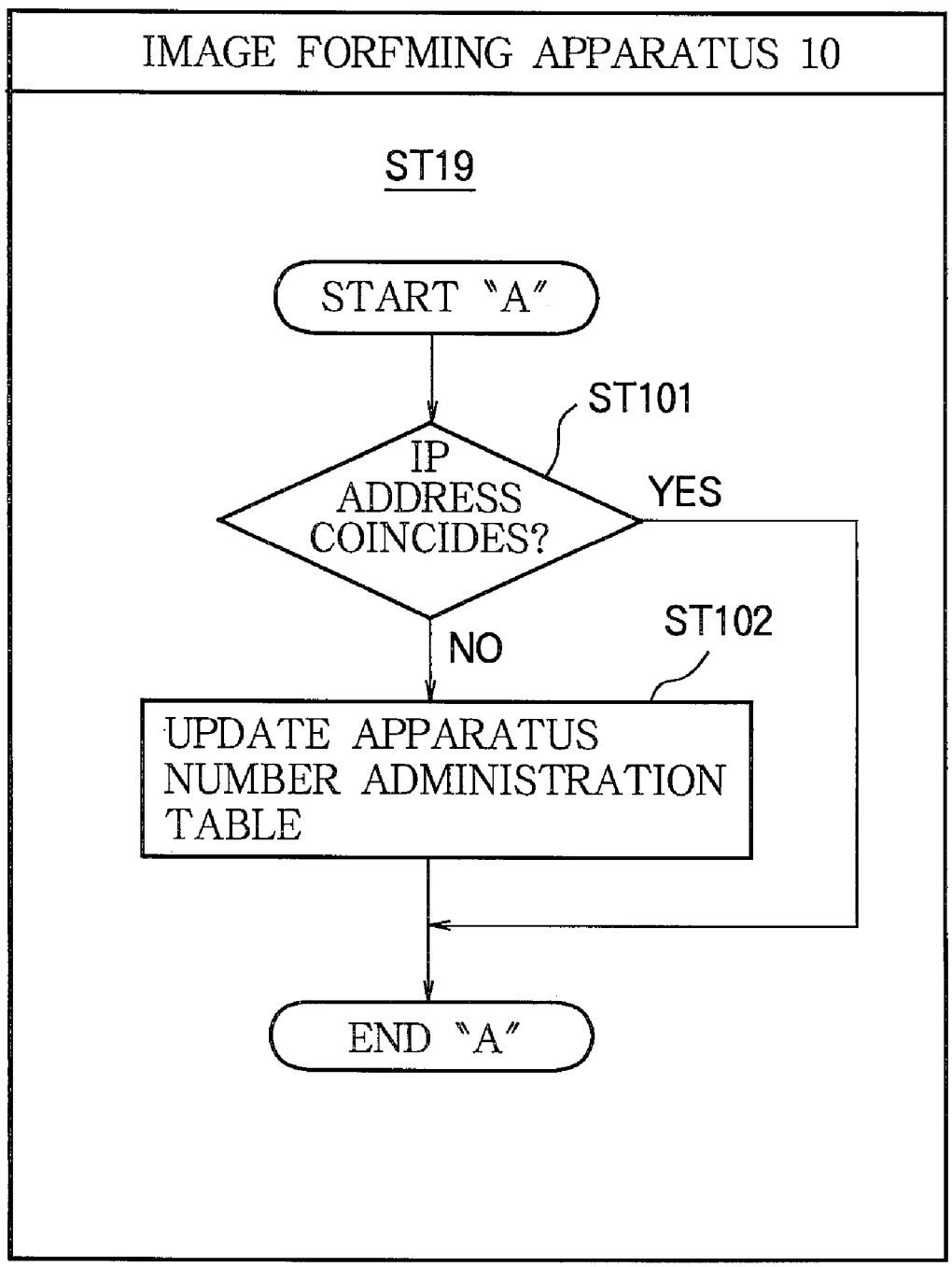
FIG. 12 is a flowchart illustrating the processing "A" carried out.

FIG. 12 is a flowchart illustrating the processing "A" carried out at ST19.

The apparatus number administrating section 74 makes a decision to determine whether the source IP address extracted from the header H1 is the same as one of the IP addresses stored in the apparatus number administration table (FIG. 9A) (ST101). If YES at ST101, the processing "A" is terminated. If NO at ST101, then it is determined that the source IP address does not exist in the apparatus number administration table (FIG. 9A). The apparatus number administrating section 74 then adds a new apparatus number "2" and the extracted source IP address A40 (i.e., "192.168.0.40") into the apparatus number administration table in FIG. 9A (ST102). Apparatus numbers following the apparatus number "2" are assigned to apparatuses that transmit the original image data D1 to the image forming apparatus 10. Then, the processing "A" is completed. Step ST2 in FIG. 10 is performed after the processing "A".

The decision at ST2 is performed in the same manner as the operation shown in FIG. 6. If the answer is YES at ST2, the original image data D1 is printed at ST10. If NO at ST2, then the CPU 11 instructs the transferring section 70 to send the original image data D1 to the format converting apparatus 20 via the network IF 18 (ST20). The transferring section 70 adds the header H2 for the original image data D1, the header H2 containing a source IP address "192.168.0.10" (=IP address A10) and a destination IP address "192.168.0.20" (=IP address A20). Then, the transferring section 70 sets an apparatus number "2" indicative of the image information processing apparatus 40 which transmitted the original image data D1 to the image forming apparatus 10, and an apparatus number "1" indicative of the format converting apparatus 20 which receives the original image data.

At steps ST4 and ST5, the format converting apparatus 20 operates in the same way as the first embodiment (FIG. 6) except for the following. The CPU 21 of the format converting apparatus 20 extracts the source apparatus number and the source IP address (IP address A10 of the image forming apparatus 10) from the header H2 of the original image data D1, and then stores the extracted source apparatus number and the source IP address into the HDD 23. The IP address A10 is stored in the source IP address storing area shown in FIG. 7C. The CPU 21 also extracts the extension K1 from the file data 102 as shown in FIG. 2D of the original image data D1 stored in the HDD 23, and then stores the extension K1 into the RAM 22.

The operation of the conversion determining section 24 is the same as that of the first embodiment (FIG. 6) except for the following portions.

{When the Original Image Data D1 Cannot be Converted Into the Ready-to-Print Data D2}

When the conversion determining table T1 does not hold the extension K1 (i.e., the original image data D1 cannot be converted into the ready-to-print image data D2), the following processing is carried out.

If the answer is NO at ST4, the CPU 21 instructs the error information transmitting section 73 to transmit the error information E1 to the image forming apparatus 10 via the network IF 30, the error information E1 being in the form of the file data shown in FIG. 3D. The header H3 of the file data of the error information E1 contains the source IP address, i.e., "192.168.0.20" (=IP address A20) and the destination address, i.e., "192.168.0.10" (=IP address A10). As shown in FIG. 11C, nothing is set as a source apparatus number to the setting at address 0DH-10H, while the apparatus number "2" of the image information processing apparatus 40 is set as a destination apparatus number to setting at address 11H-14H.

Upon receiving the error information E1, the network IF 18 of the image forming apparatus 10 transfers the error information E1 to the receiving section 17. The receiving section 17 transfers the error information E1 to the RAM 12. Then, after confirming that the destination apparatus number in the header H3 of the error information E1 is "2", the CPU 11 transmits the error information E1 to the image information processing apparatus 40 whose apparatus number is "2" (ST22). The header H4 of the file data of the error information E1 contains the source IP address, i.e., "192.168.0.10" (=IP address A10) and the destination address, i.e., "192.168.0.40" (=IP address A40). As shown in FIG. 11D, the source apparatus number "1" indicative of the format converting apparatus 20 is set to the setting 363, while the destination apparatus number "2" indicative of the image information processing apparatus 40 remains unchanged.

As described above, because the error information E1 is transmitted via the image forming apparatus 10, the IP address of the format converting apparatus 20 which is a source device is not known to the image information processing apparatus 40. This provides invisible security such that any user is prevented from accessing or seeing the IP address of the format converting apparatus 20.

Upon receiving the error information E1, the network IF 50 of the image information processing apparatus 40 transfers the error information E1 to the error information receiving section 78, which in turn transfers the error information E1 to the display section 44. The display section 44 then displays the error information E1 (ST16). This completes the processing.

{When the Original Image Data D1 can be Converted Into the Ready-to-Print Image Data D2}

When the conversion determining table T1 holds the extension K1 (i.e., the original image data D1 can be converted into the ready-to-print image data D2), the following processing is carried out.

The CPU 21 instructs the display information transmitting section 26 to transmit the display information S1 to the image forming apparatus 10 via the network IF 30 (ST5). The CPU 21 adds the header H3 to the display information S1. The header H3 of the file data of the error information E1 contains the source IP address, i.e., "192.168.0.20" (=IP address A20) and the destination address, i.e., "192.168.0.10" (IP address A10). As shown in FIG. 11C, nothing is set as a source apparatus number to the setting at address 0DH-10H, while the apparatus number "2" of the image information processing apparatus 40 is set as a destination apparatus number to setting at address 11H-14H.

Upon receiving the display information S1, the network IF 18 of the image forming apparatus 10 transfers the display information S1 to the receiving section 17. The receiving section 17 then transfers the display information S1 to the RAM 12. Then, after confirming that the destination apparatus number in the header H3 of the display information S1 is "2", the CPU 11 transmits the display information S1 having the header H4 to the image information processing apparatus 40 whose apparatus number is "2" (ST24). The header H4 of the display information S1 containing the source IP address, i.e., "192.168.0.10" (=IP address A10) and the destination address, i.e., "192.168.0.40" (IP address A40). As shown in FIG. 1D, the apparatus number "1" of the format converting apparatus 20 is set as a source apparatus number to the setting at address 0DH-10H, and the apparatus number "2," which is the apparatus number of the image information processing apparatus 40 remains as the setting at address 11H-14H.

At ST6 and ST7, the printing condition setting screen 200 is displayed on the image information processing apparatus 40 to prompt the user to input printing conditions. Then, the printing conditions S2 are converted into file data, and are transmitted from the image information processing apparatus 40. The operation at ST6 and ST7 is the same as that of the first embodiment (FIG. 6) except the following.

At ST7, after the user has inputted the printing conditions S2, a CPU 41 instructs the print condition transmitting section 75 to transmit the printing conditions S2 to the image forming apparatus 10 via the network IF 50. As shown in FIG. 11E, a header H5 is attached to the printing conditions S2, containing a source IP address, i.e., "192.168.0.40" (=IP address A40) and a destination address, i.e., "192.168.0.10" (=IP address A10). Nothing is set as a source apparatus number to the setting at address 0DH-10H, while the apparatus number "1" of the format converting apparatus 20 is set as a destination apparatus to the setting at address 11H-14H.

Upon receiving the printing conditions S2, the network IF 18 of the image forming apparatus 10 transfers the printing conditions S2 to the receiving section 17, which in turn transfers the printing conditions S2 to the RAM 12. Thereafter, after confirming that the destination apparatus number of the printing conditions S2 is "1", the CPU 11 transmits the printing conditions S2 to the format converting apparatus 20 whose apparatus number is "1" (ST26). As shown in FIG. 11B, the header H2 is attached to the printing conditions S2, containing a source IP address, i.e., "192.168.0.10" (=IP address A10) and a destination address, i.e., "192.168.0.20" (=IP address A20). The apparatus number "2" of the image information processing apparatus 40 is set as a source apparatus number to the setting at address 0DH-10H, and the apparatus number "1" of the format converting apparatus 20 is set as a destination apparatus number to the setting at address 11H-14H.

At steps ST8 and ST9, the format converting apparatus 20 receives the printing conditions S2, and the CPU 21 converts the original image data D1 into the ready-to-print data D2 (e.g., data encoded in a page description language and bit map) based on printing conditions S2. The ready-to-print data D2 is transmitted together with an extension "prn" to the image forming apparatus 10 via the network IF 30. The operation at steps ST8 and ST9 is the same as that of the first embodiment (FIG. 6) except the following.

When the ready-to-print image data D2 is transmitted to the image forming apparatus S10, a header H6 is attached to the ready-to-print data D2. The header H6 (FIG. 11F) a source IP address, i.e., "192.168.0.20" (=IP address A20) and a destination IP address, i.e., "192.168.0.10" (=IP address A10). The ready-to-print data D2 is sent to the network IF 30 without specifying a destination apparatus number and a source apparatus number.

Upon receiving the ready-to-print data D2, the network IF 18 of the image forming apparatus 10 transfers the ready-to-print data D2 to the receiving section 17, which in turn transfers the ready-to-print data D2 to the RAM 12. The printing determining section 14 makes a decision to determine whether the image forming apparatus 10 can print the ready-to-print data D2 (ST2). Then, the printing determining section 14 extracts the extension K1 in the file data shown in FIG. 2D from the ready-to-print data D2, and makes a decision to determine whether the conversion determining table T1 (FIG. 3C) holds the same extension as the extension K1. At this moment, the extension K1 of the ready-to-print image data D2 is "prn", which is the same as one of the extensions stored in the conversion determining table T1. Thus the program proceeds to step ST10.

The CPU 11 analyzes and renders the ready-to-print image data D2 encoded in, for example, a page description language, into image data that can be printed by the image forming apparatus 10, and then stores the ready-to-print image data D2 into the RAM 12. Then, the CPU 11 instructs the print engine 15 to print the image data stored in the RAM 12 (ST10). The image forming system of the second embodiment operates as described above provided that the original image data D1 can be converted by the format converting apparatus 20 into the ready-to-print image data D2.

The outline of the flow of the operation of the image forming system of the second embodiment is as follows:

The image information processing apparatus 40 transfers the original image data D1 to the image forming apparatus 10. The image forming apparatus 10 makes a decision to determine whether the received original image data D1 is in a file format supported by the image forming apparatus 10. If not, the image forming apparatus 10 sends the original image data D1 to the format converting apparatus 20 which in turn converts the original image data D1 into the ready-to-print data D2. Then, the image forming apparatus 10 receives the ready-to-print data D2 from the format converting apparatus 20, and then prints the ready-to-print data D2.

However, the image forming system of the second embodiment differs from that of the first embodiment in that information is transmitted and received via the image forming apparatus 10. Prior to the conversion of the original image data D1 into the ready-to-print data D2, the format converting apparatus 20 transmits the display information S1 to the image information processing apparatus 40 via the image forming apparatus 10, thereby prompting the user to input the settings for printing from the image information processing apparatus 40. Then, the image information processing apparatus 40 sends the settings for printing to the format converting apparatus 20.

If the data is sent from the format converting apparatus 20 to the image information processing apparatus 40 directly just as in the first embodiment, the IP address of the format converting apparatus 20 is leaked to the image information processing apparatus 40. The second embodiment addresses this problem. The information is communicated between the format converting apparatus 20 and the image information processing apparatus 40 via the image forming apparatus 10, so that the IP address of the format converting apparatus 20 is not leaked to the image information processing apparatus 40, thereby improving security of data. If the IP address is leaked, the apparatus having the IP address may be identified so that access to the apparatus may be attempted. This results in poor security.

As described above, the image forming apparatus 10 includes the transferring section 70 transfers the display information S1 received from the format converting apparatus 20 to the image information processing apparatus 40, and transfers the printing conditions S2 received from the image information processing apparatus 40 to the format converting apparatus 20. The display information transmitting section 71 transmits display information S1 to the transferring section 70 of the image forming apparatus 10, which in turn transfers the display information S1 to the image information processing apparatus 40. The printing condition transmitting section 46 of the image information processing apparatus 40 transmits the printing conditions S2 to the transferring section 70 of the image forming apparatus 10, which in turn transmits the printing conditions S2 to the format converting apparatus 20.

The image forming apparatus 10 includes the transferring section 70 that transfers the error information E1 received from the format converting apparatus 20 to the image information processing apparatus 40. The error information transmitting section 73 of the format converting apparatus 20 transmits the display screen of the error information E1 to the transferring section 70 of the image forming apparatus 10. The transferring section 70 transfers the display screen to the image information processing apparatus 40 via the image forming apparatus 10. While the second embodiment has been described with respect to the apparatuses connected to one another via the network, the invention may be applied to a system where the apparatuses are connected directly via USB.

When the data is communicated between the format converting apparatus 20 and the image information processing apparatus 40 via the image forming apparatus 10, the source IP address of the header being converted into the IP address A10 of the image forming apparatus 10. This prevents the IP addresses of the format converting apparatus 20 and the image information processing apparatus 40 from leaking from one apparatus to the other. This improves security.

Third Embodiment

Figure 13:
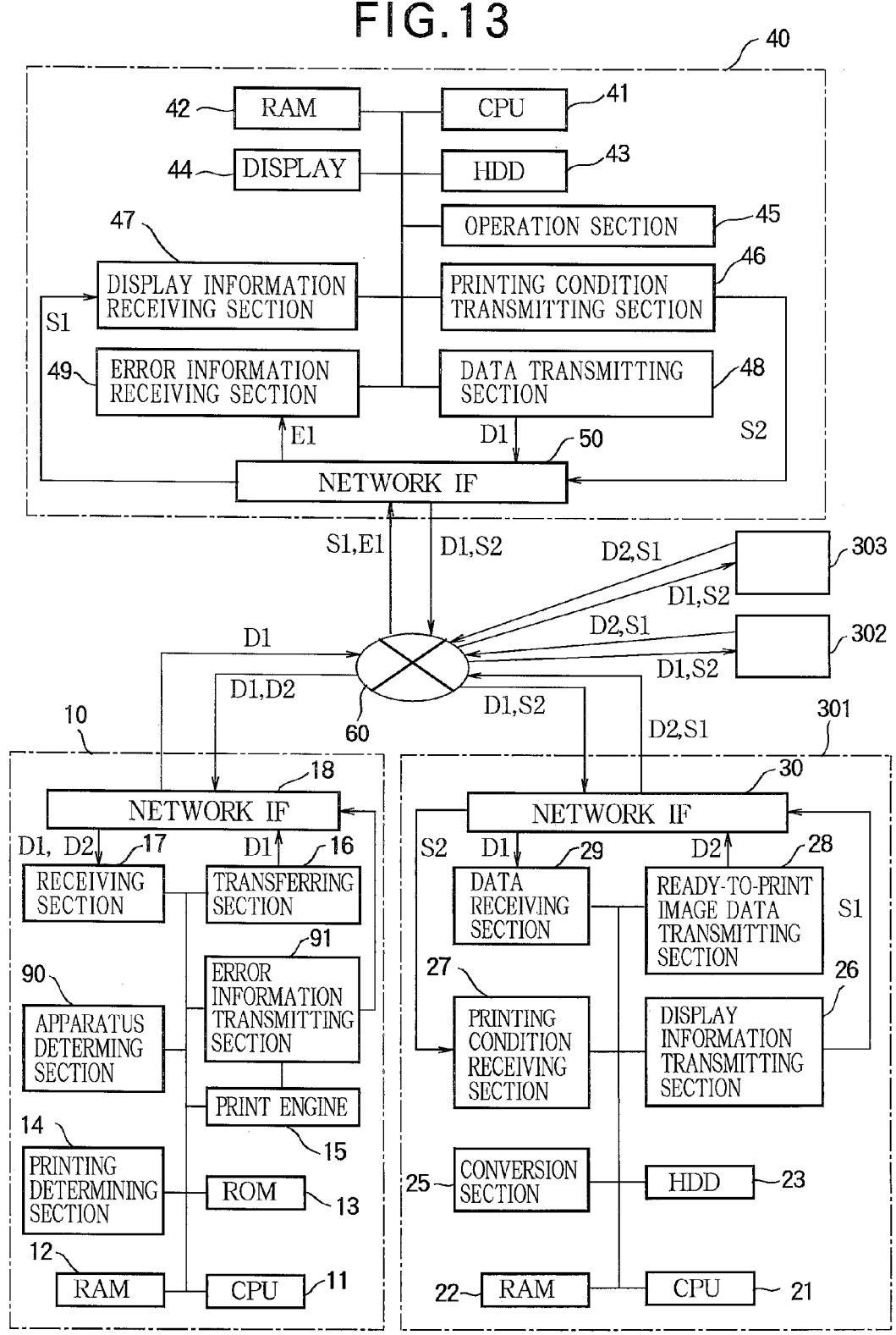
FIG. 13 is a block diagram illustrating an image forming system of a third embodiment.

FIG. 13 is a block diagram illustrating an image forming system of a third embodiment. Some portions identical with those of the first embodiment have been omitted.

A plurality of format converting apparatuses 301, 302, and 303 correspond to the format converting apparatuses 20 of the first embodiment, and are connected to an image forming apparatus 10 via a network 60. The format converting apparatus of the third embodiment differs from that of the first embodiment in that the conversion determining section 24 and error information transmitting section 31 are not used.

The image forming apparatus 10 of the third embodiment differs from that of the first embodiment in that a conversion apparatus determining section 90 and an error information transmitting section 91 are used. The conversion apparatus determining section 90 determines whether received data can be converted by the format converting apparatuses 301, 302, and 303. The error information transmitting section 91 transmits error information E1 to the image information processing apparatus 40.

The conversion apparatus determining section 90 includes a conversion apparatus determining table T3. The conversion apparatus determining table T3 lists the file data file formats in terms of their extensions such that a decision may be made as to which format converting apparatus should be used to convert image data into ready-to-print image data D2. The conversion apparatus determining table T3 lists format converting apparatuses 301, 302, and 303, corresponding IP addresses 192.168.0.301, 192.168.0.302, 192.168.0.303, and corresponding extensions doc, pdf, and bmp.

Figure 14:
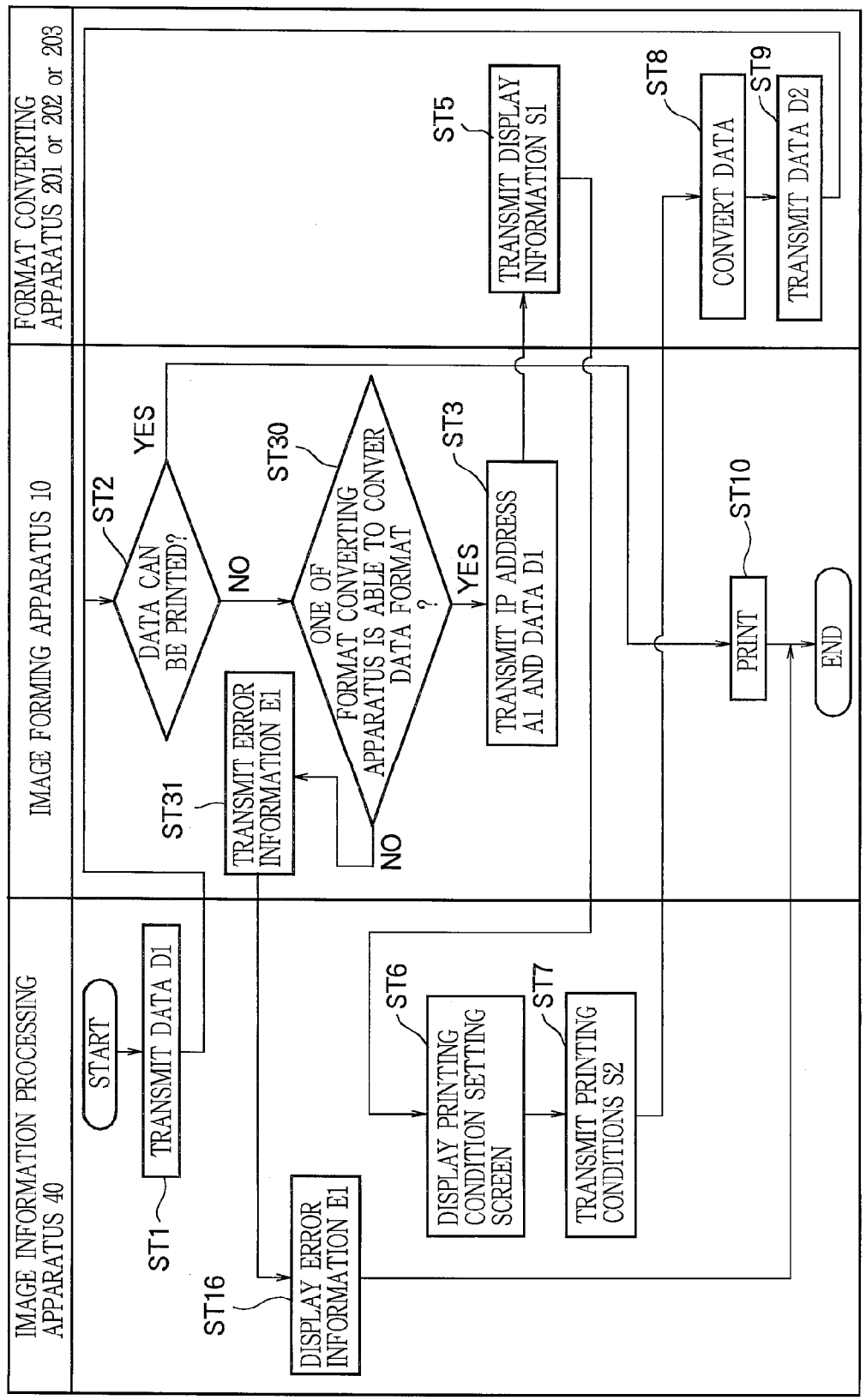
FIG. 14 is a flowchart illustrating the operation of the image forming system.

The operation of the image forming system of the third embodiment will be described in detail;

FIG. 14 is a flowchart illustrating the operation of the image forming system. FIG. 15 is a conversion apparatus determining table T3 that holds extensions of file data that may be supported by image format converting apparatuses.

The operations at steps ST1-ST3, ST5-ST10, and ST16 are the same as those of the first embodiment (FIG. 6) and their description is omitted.

When a user operates an operation section 45 of the image information processing apparatus 40 to command to print original image data D1, a CPU 41 instructs a data transmitting section 48 to transmit the original image data D1 stored in an HDD 43 to the image forming apparatus 10 via a network IF 50 (ST1). At this moment, a header 101 (FIG. 2C) is attached to the top of the original image data D1.

A network IF 18 in the image forming apparatus 10 receives the original image data D1, and transfers the original image data D1 to a receiving section 17. The receiving section 17 stores the original image data D1 into a RAM 12. The CPU 11 extracts the source IP address from the header of the original image data D1, and then stores the extracted source IP address into a source IP address storing area (FIG. 7A) defined in the RAM 12, the extracted source IP address being stored as an IP address A40 of the image information processing apparatus 40.

Thereafter, a printing determining section 14 makes a decision as to whether the original image data D1 is in a file format supported by the image forming apparatus 10 (ST2). Specifically, the printing determining section 14 extracts the extension K1 of the file data shown in FIG. 2D from the original image data D1, and then makes a decision as to whether an extension table T2 (FIG. 3C) holds an extension identical with the extension K1. If the extension table T2 holds an extension identical with the extension K1, then the printing determining section 14 determines that the original image data D1 is not in a file format supported by the image forming apparatus 10 (ST2: YES). If the extension table T2 does not hold an extension identical with the extension K1, then the printing determining section 14 determines that the original image data D1 is in a file format not supported by the image forming apparatus 10 (ST2: NO).

If the original image data D1 is in a file format supported by the image forming apparatus 10 (ST2: YES), the program proceeds to step ST10 where the image forming apparatus 10 prints the content of the original image data D1.

If the original image data D1 is not in a file format supported by the image forming apparatus 10, the program proceeds to step ST30 where a check is made to determine whether one of the format converting apparatuses 301, 302, 303 may be able to convert the original image data D1 into image data that can be printed by the image forming apparatus 10.

At step ST30, the conversion apparatus determining section 90 makes a decision to determine whether the conversion apparatus determining table T3 holds an extension identical with the extension K1. If the conversion apparatus determining table T3 holds an extension identical with the extension K1, then the conversion apparatus determining section 90 determines that there is a format converting apparatus that supports conversion of the original image data D1 into image data that can be printed by the image forming apparatus, and the program proceeds to step ST3. If the conversion apparatus determining table T3 does not hold an extension identical with the extension K1, the conversion apparatus determining section 90 determines that there is a format converting apparatus that supports conversion of the original image data D1 into image data that can be printed by the image forming apparatus 10. Then, the program proceeds to step ST31.

If the original image data D1 cannot be converted into the file format supported by the image forming apparatus 10 (ST30: NO), the following processing is performed at step ST31. The CPU 11 of the image forming apparatus 10 instructs the error information transmitting section 31 to transmit the error information E1 to the image information processing apparatus 40 via a network IF 30. The error information E1 takes the form of the file data shown in FIG. 3D. When the image forming apparatus 10 transmits any type of data to the image information processing apparatus 40, the image forming apparatus 10 specifies the IP address A40 stored in the source IP address storing area, the IP address A40 being a destination IP address added to the header.

The network IF 50 of the image information processing apparatus 40 receives the error information E1, and transfers the error information E1 to an error information receiving section 49, which in turn transfers the error information E1 to a display section 44. The display section 44 displays the error information E1 (ST16), thereby completing the flow of operation.

If one of the format converting apparatuses 301, 302, and 303 supports conversion of the original image data D1 into image data that can be printed by the image forming apparatus 10 (ST30: YES), the following operation is performed at step ST31. For the sake of convenience, an image processing apparatus capable of converting the original image data D1 into the ready-to-print image data D2 is defined as "20X."

The CPU 11 of the image forming apparatus S10 instructs a transferring section 16 to sequentially transmit the IP address A40 (FIG. 3B) and the original image data D1 to the format converting apparatus 20X. The IP address A20X of the format converting apparatus 20X, which is a destination of the original image data D1, is stored in the conversion apparatus determining table T3. When the image forming apparatus 10 transmits any type of data to the format converting apparatus 20X, the IP address A20X is added to the destination IP address of the header. The IP address A10 which is the IP address of the image forming apparatus 10 is specified as a source IP address.

The network IF 30 of the format converting apparatus 20X receives the original image data D1 and the IP address A40, and transfers the original image data D1 and the IP address A40 to a data receiving section 29, which in turn stores the original image data D1 and the IP address A40 into the HDD 23. Thereafter the CPU 21 instructs a display information transmitting section 26 to transmit the display information S1 to the image information processing apparatus 40 via the network IF 30 (ST5), the display information S1 being used for displaying a printing condition setting screen 200. At this moment, the IP address A40 stored in the source IP address storing area is added as the destination IP address to the header.

The network IF 50 of the image information processing apparatus 40 receives the display information S1 from the format converting apparatus 20X, and transfers the display information S1 to a display information receiving section 47, which in turn transfers the display information S1 to the display section 44. The display section 44 displays a printing the display information S1 on a printing condition setting screen 200 (ST6) The user sets the printing conditions S2 through the printing condition setting screen 200 displayed on the display section 44. The printing conditions S2 include items as shown in FIG. 5A, which are arranged by the CPU 41 in the form of file data 230 as shown in FIG. 5B.

FIG. 5A is a table that lists printing conditions: item numbers, corresponding names of setting, and corresponding settings. For item No. 1, orientation of printed image is selected from settings 0, 1, and 2. For item No. 2, duplex is selected from 0, 1, and 2. For item No. 3, printing order is selected from 0 and 1. For item No. 3, Number of pages on each sheet in the N-up printing is selected from 1, 2, 4, and 8. For example, the orientation in FIG. 5A is selected to be "0", "1" or "2" for "portrait (R)," "landscape (L)," or "rotation into landscape (E)", respectively.

A setting for "duplex" is "0", "1" or "2" indicative of "NO (i.e., simplex)," "a long side is bound," or "a short side is bound," respectively. The CPU 41 stores one of "0", "1" or "2" as a setting for "duplex" into the file data in FIG. 5B.

Likewise, either "0" or "1" is selected when the. "page order" is either "forward (O)" or "reverse (R). Then, the CPU 41 stores the selected setting as "page order" of the file data 230 into the file data in FIG. 5B.

Likewise, when the "Number of pages" 204 is one of "1", "2," "4," and "8," a corresponding setting 224, i.e. , one of "1", "2", "4" and "8" in FIG. 5A is selected. Then, the CPU 41 stores the selected setting as "Number of pages" of the file data 230 containing the printing conditions S2 of FIG. 5B.

As described above, the CPU 41 stores the settings on the printing condition setting screen 200 into the file data containing the printing conditions S2. After the user has set the printing conditions S2, the CPU 41 instructs the printing condition transmitting section 46 to transmit the file data 230 containing the printing conditions S2 to the format converting apparatus 20X via the network IF 50 (ST7). The destination IP address added to the header is the IP address A20X, which is stored in the source IP address of the header of the display information S1.

Upon receiving the file data 230 containing the printing conditions S2, the network IF 30 of the format converting apparatus 20X transfers the printing conditions S2 to the printing condition receiving section 27, which in turn stores the printing conditions S2 into the HDD 23. The CPU 21 reads the original image data D1 from the HDD 23, and sends the original image data D1 to the conversion section 25. In accordance with the printing conditions S2, the conversion section 25 converts the original image data D1 into the ready-to-print image data D2 (e.g., data and bit map encoded in a page description language) supported by the image forming apparatus 10. Then, the ready-to-print image data D2 is stored into the HDD 23 (ST8).

The CPU 21 instructs the ready-to-print print image data transmitting section 28 to transmit the ready-to-print image data D2 to the image forming apparatus 10 via the network IF 30 (ST9). The destination IP address added to the header is the IP address A10, which is stored in the IP address table (FIG. 7C) for the print image information transmission destination defined in the HDD 23.

Upon receiving the ready-to-print image data D2, the network IF 18 of the image forming apparatus 10 transfers the ready-to-print image data D2 to the receiving section 17, which in turn stores the ready-to-print image data D2 into the RAM 12. Thereafter, the printing determining section 14 makes a decision to determine whether the ready-to-print image data D2 can be printed by the image forming apparatus 10 (ST2). The printing determining section 14 extracts the extension K1 from the file data shown in FIG. 2D, and then makes a decision as to whether the extension K1 is identical with one of extensions stored in the conversion determining table T2 in FIG. 3C. The extension K1 of the ready-to-print image data D2 is "prn," which exists in the conversion determining table T2. Thus, the program proceeds to step ST10.

The CPU 11 analyzes and renders the ready-to-print image data D2 encoded in a page description language to produce image data that can be printed by the image forming apparatus 10, and then stores the image data into the RAM 12. The CPU 11 then instructs a print engine 15 to print the image data in the RAM 12 (ST10). While the image forming processing apparatus 40 and the image forming apparatus 10 are connected to each other via the network 60, they may be directly connected via, for example, USB.

In the third embodiment, a plurality of format converting apparatuses 20X is involved. The image forming apparatus 10 includes the conversion apparatus determining section 90. The conversion apparatus determining section 90 holds information on file formats supported by the respective format converting apparatuses 20. The conversion apparatus determining section 90 makes a decision as to whether the file format of the input image data is supported by one of the format converting apparatuses 20, and to determine by which format converting apparatus 20 the original image data D1 may be converted into the ready-to-print image data D2. The conversion apparatus determining section 90 sends the original image data D1 to an appropriate format converting apparatus 20.

The image forming apparatus 10 includes an error information screen storing section 13 (ROM) and an error information transmitting section 91. The error information screen storing section 13 stores a display screen for the error information E1 when the conversion apparatus determining section 90 determines that the original image data D1 cannot be converted into the ready-to-print data D2 by any one of format converting apparatuses 20. The error information transmitting section 91 transmits the display screen for the error information E1 to the image information processing apparatus 40. The image information processing apparatus 40 includes an error information receiving section 49 that receives the error information E1. The display section 44 displays the error information E1.

As described above, the third embodiment provides advantages in addition to those of the first embodiment as follows:

The image forming apparatus 10 makes a decision as to which of a plurality of format converting apparatuses is capable of converting the original image data D1 into the ready-to-print data D2. Therefore, when the original image data D1 cannot be converted into the ready-to-print data within the image forming apparatus 10, an appropriate one of the format converting apparatuses may be identified quickly, saving the time spent for sending the original image data D1 to the plurality of format converting apparatuses to identify a format converting apparatus capable of converting the original image data D1 into the ready-to-print data D2. This in turn shortens the time before it is determined that the original image data D1 cannot be converted into the ready-to-print data D2 by any one of the format converting apparatuses. The conversion determining section 24 efficiently determines an available apparatus from among a plurality of a plurality of format converting apparatuses 301, 302, and 303. This allows efficient search for a format converting apparatus 20X capable of converting the original image data D1 into the ready-to-print data D2.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming system including an image information processing apparatus that outputs image data, at least one format converting apparatus that converts the image data into ready-to-print data, and an image forming apparatus that prints out the ready-to-print image data, wherein the image information processing apparatus, image forming apparatus, and the at least one format converting apparatus are connected via a network such that the image information processing apparatus, the image forming apparatus, and the at least one format converting apparatus communicate with one another, wherein the image information processing apparatus includes:
an image data transmitting section configured to transmit the image data to the image forming apparatus;
a display information receiving section configured to receive display information from the format converting apparatus;
a display section that displays a printing condition setting screen in accordance with the display information;
an operation section through which a user inputs a printing condition via the printing condition setting screen; and
a printing condition transmitting section configured to transmit the printing condition to the format converting apparatus;

wherein the image forming apparatus includes:
a receiving section configured to receive either the image data from the image information processing apparatus or the ready-to-print image data from the format converting apparatus;
a printing determining section configured to make a decision to determine whether the image forming apparatus supports conversion of the image data into the ready-to-print image data;
a transferring section configured to transfer the image data to the format converting apparatus if said printing determining section determines that the image forming apparatus does not support conversion of the image data into the ready-to-print image data; and a print engine that prints the ready-to-print image data on a printing medium;

wherein the format converting apparatus includes:
- a display information transmitting section configured to transmit the display information to the image information processing apparatus;
- a printing condition receiving section configured to receive a printing condition from the image information processing apparatus;
- a data receiving section configured to receive the original image data from the image forming apparatus;
- a converting section configured to convert the image data into the ready-to-print data in accordance with the printing condition; and
- a ready-to-print image data transmitting section configured to transmit the ready-to-print image data to the image forming apparatus.

2. The image forming system according to claim 1, wherein said display information receiving section receives the display information from the format converting apparatus via the image forming apparatus; and
said printing condition transmitting section transmits the printing condition to the format converting apparatus via the image forming apparatus;
wherein said display information transmitting section transmits the display information to the image information processing apparatus via the image forming apparatus; and
said printing condition receiving section receives the printing condition from the image information processing apparatus via the image forming apparatus;
wherein said transferring section transfers the display information received from the format converting apparatus to the image information processing apparatus, said transferring section transferring the printing condition received from the image information processing apparatus to the format converting apparatus.

3. The image forming system according to claim 1, wherein said format converting apparatus is one of a plurality of format converting apparatuses;
wherein the image forming apparatus further includes:
a conversion apparatus determining section that determines which of the plurality of format converting apparatuses supports conversion of the image data into the ready-to-print data;
wherein said transferring section transfers the image data to a format converting apparatus that supports conversion of the image data into the ready-to-print data.

4. The image forming system according to claim 1, wherein the format converting apparatus that supports conversion of the image data into the ready-to-print data is determined based on a data format of the image data.

5. The image forming system according to claim 1, wherein the format converting apparatus and the image information processing apparatus are connected through a communication network;
wherein the image information processing apparatus further includes:
a first address storing section that stores a first address, the first address indicating a location of the image information processing apparatus on the network;
a second address storing section that stores a second address, the second address indicating the location of the format converting apparatus on the network;
wherein when said printing condition transmitting section transmits the printing condition to the format converting apparatus, said printing condition transmitting section outputs the first address and the second address together with the printing condition;
wherein the format converting apparatus further includes:
a third address storing section that stores the first address and the second address;
wherein when said display information transmitting section transmits the display information to the image information processing apparatus, said display information transmitting section outputs the first address and the second address together with the display information.

6. The image forming system according to claim 1, wherein the format converting apparatus and the image forming apparatus are connected through a communication network;
wherein the image forming apparatus further includes:
a first address storing section that stores a first address and a second address, the first address indicating a location of the image forming apparatus on the network, and the second address indicating the location of the format converting apparatus on the network;
wherein when said transferring section transfers the image data to the format converting apparatus, said transferring section outputs the first address and the second address together with the image data;
wherein the format converting apparatus further includes a second address storing section that stores the first address and the second address;
wherein when said ready-to-print image data transmitting section outputs the ready-to-print image data to the image forming apparatus, said ready-to-print image data transmitting section outputs the first address and the second address together with the ready-to-print image data.

7. The image forming system according to claim 1, wherein the image information processing apparatus, the format converting apparatus, and the image forming apparatus are connected through a communication network;
wherein the image information processing apparatus further includes:
a first address storing section that stores a first address, the first address indicating a location of the image information processing apparatus on the network;
a second address storing section that stores a second address, the second address indicating the location of the format converting apparatus on the network;
wherein when said image data transmitting section transmits the image data to the image forming apparatus, said image data transmitting section outputs the first address and the second address together with the image data;
wherein when said printing condition transmitting section transmits the printing condition to the format converting apparatus, said printing condition transmitting section outputs the first address and the second address together with the printing condition;
wherein the image forming apparatus further includes:
a third address storing section that stores the first address;
a fourth address storing section that stores a third address and the second address;
wherein when said transferring section transfers the image data to the format converting apparatus, said transferring section outputs the first address, the third address, and the second address together with the image data;
wherein the format converting apparatus further includes:
a fifth address storing section that stores the first address, the third address, and the second address;
wherein when said ready-to-print image data transmitting section transmits the ready-to-print image data to the image forming apparatus, said ready-to-print image data transmitting section outputs the third address and the second address together with the ready-to-print image data;

wherein when said display information transmitting section transmits the display information to the image information processing apparatus, said display information transmitting section outputs the first address and the second address together with the display information.

8. The image forming system according to claim 1, wherein the printing condition includes print orientation, duplex and page order.

9. The image forming system according to claim 1, wherein the format converting apparatus further includes:
a conversion determining section that determines whether the format converting apparatus supports conversion of the image data into the ready-to-print image data; and
an error information transmitting section that transmits error information to the image information processing apparatus if said conversion determining section determines that the format converting apparatus does not support conversion of the image data into the ready-to-print image data into the ready-to-print data;
wherein the image information processing apparatus further includes:
an error information receiving section that receives the error information from the format converting apparatus; and
wherein said display section displays the error information.

10. The image forming system according to claim 9, wherein said error information receiving section receives the error information from the format converting apparatus via the image forming apparatus;

wherein said error information transmitting section transmits the error information to the image information processing apparatus via the image forming apparatus;
wherein said transferring section transfers the error information received from the format converting apparatus to the image information processing apparatus.

11. The image forming system according to claim 9, wherein the format converting apparatus and the image information processing apparatus are connected through a communication network;
wherein the format converting apparatus further includes:
an address storing section that stores a first address and a second address, the first address indicating a location of the image information processing apparatus on the network, and the second address indicating the location of the format converting apparatus on the network;
wherein when said error information transmitting section transmits error information to the image information processing apparatus, said error information transmitting section outputs the first address and the second address together with the error information.

12. The image forming system according to claim 11, wherein the image forming apparatus further includes:
an error information transmitting section transmits error information to the image information processing apparatus when said conversion apparatus determining section determines none of the plurality of format converting apparatuses supports conversion of the image data into the ready-to-print data;
wherein the image information processing apparatus further includes an error information receiving section that receives the error information from the image forming apparatus; and
wherein said display section displays the error information.

* * * * *